(12) United States Patent
Yamada et al.

(10) Patent No.: US 10,811,658 B2
(45) Date of Patent: *Oct. 20, 2020

(54) SEPARATOR AND METHOD OF PREPARING THE SAME, AND LITHIUM ION SECONDARY BATTERY

(71) Applicant: Asahi Kasei Kabushiki Kaisha, Tokyo (JP)

(72) Inventors: Yusuke Yamada, Tokyo (JP); Makoto Uozumi, Tokyo (JP); Takashi Misao, Tokyo (JP); Mitsutaka Nakamura, Tokyo (JP); Masaaki Sasayama, Tokyo (JP); Kazufumi Kato, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 14/429,619

(22) PCT Filed: Sep. 17, 2013

(86) PCT No.: PCT/JP2013/075049
§ 371 (c)(1),
(2) Date: Mar. 19, 2015

(87) PCT Pub. No.: WO2014/046094
PCT Pub. Date: Mar. 27, 2014

(65) Prior Publication Data
US 2015/0270522 A1    Sep. 24, 2015

(30) Foreign Application Priority Data

Sep. 19, 2012  (JP) ................................. 2012-206105
Sep. 19, 2012  (JP) ................................. 2012-206121

(51) Int. Cl.
*H01M 2/00* (2006.01)
*H01M 2/16* (2006.01)
(Continued)

(52) U.S. Cl.
CPC .......... *H01M 2/1686* (2013.01); *H01G 11/52* (2013.01); *H01M 2/145* (2013.01);
(Continued)

(58) Field of Classification Search
CPC ............. H01M 2/1633; H01M 2/1646; H01M 2/1686; H01M 10/052; H01G 11/52
See application file for complete search history.

(56) References Cited

U.S. PATENT DOCUMENTS 5,075,184 A * 12/1991 Tanaka ................ H01M 2/1613
429/144
5,522,810 A   6/1996 Allen, Jr. et al.
(Continued)

FOREIGN PATENT DOCUMENTS

DE    10208280 A1    9/2003
EP     2328220 A2    6/2011
(Continued)

OTHER PUBLICATIONS

Partial Supplementary European Search Report issued in corresponding European Patent Application No. 13838737.8 dated Sep. 9, 2015.
(Continued)

*Primary Examiner* — Nicholas P D'Aniello
(74) *Attorney, Agent, or Firm* — Morgan, Lewis & Bockius LLP

(57) ABSTRACT

An object of the present invention is to provide a separator maintaining high rate characteristics and enabling suppression of short circuit. The object is achieved by a separator comprising a substrate having an inner surface and an outer
(Continued)

surface, and inorganic particles presented on the outer surface and the inner surface of the substrate, wherein the substrate has a porosity of 55% or more and a mean flow pore size of 30 μm or less, the inorganic particles have an average particle size of 1.0 to 4.0 μm, and the inorganic particles comprises 40% by volume or less of particles having a particle size of 1.0 μm or less and 30 to 75% by volume of particles having a particle size of 2.0 μm or more.

12 Claims, 5 Drawing Sheets

(51) Int. Cl.
 *H01G 11/52* (2013.01)
 *H01M 2/14* (2006.01)
 *H01M 10/052* (2010.01)

(52) U.S. Cl.
 CPC ......... *H01M 2/162* (2013.01); *H01M 2/1646* (2013.01); *H01M 10/052* (2013.01); *Y02E 60/13* (2013.01); *Y02T 10/7022* (2013.01)

(56) References Cited

U.S. PATENT DOCUMENTS

| | | | |
|---|---|---|---|
| 6,403,265 B1 * | 6/2002 | Tanaka | H01M 2/1613 429/142 |
| 6,432,586 B1 * | 8/2002 | Zhang | H01M 2/164 429/231.95 |
| 9,461,290 B2 * | 10/2016 | Yamada | H01G 11/52 |
| 2003/0003363 A1 | 1/2003 | Daido et al. | |
| 2003/0017386 A1 | 1/2003 | Daido et al. | |
| 2004/0012476 A1 | 1/2004 | Yang | |
| 2005/0221165 A1 | 10/2005 | Hennige et al. | |
| 2006/0024569 A1 * | 2/2006 | Hennige | H01M 2/162 429/144 |
| 2006/0046138 A1 | 3/2006 | Hennige et al. | |
| 2007/0264577 A1 | 11/2007 | Katayama et al. | |
| 2009/0067119 A1 | 3/2009 | Katayama et al. | |
| 2010/0189936 A1 | 7/2010 | Irie et al. | |
| 2010/0203396 A1 | 8/2010 | Murata | |
| 2010/0221965 A1 | 9/2010 | Katayama et al. | |
| 2010/0279173 A1 | 11/2010 | Hying et al. | |
| 2010/0285348 A1 | 11/2010 | Murata et al. | |
| 2011/0305941 A1 * | 12/2011 | Park | H01M 2/162 429/145 |
| 2012/0094184 A1 | 4/2012 | Abe et al. | |
| 2012/0141859 A1 | 6/2012 | Murata et al. | |
| 2012/0154985 A1 | 6/2012 | Kato et al. | |

FOREIGN PATENT DOCUMENTS

| | | | |
|---|---|---|---|
| EP | 2835843 A1 | 2/2015 | |
| EP | 2328209 B1 | 7/2015 | |
| JP | 11131355 A | * | 5/1999 |
| JP | 2003-187867 A | 7/2003 | |
| JP | 2005-159283 A | 6/2005 | |
| JP | 2005-518272 A | 6/2005 | |
| JP | 2005-293891 A | 10/2005 | |
| JP | 2008-210541 A | 9/2008 | |
| JP | 2008-210548 A | 9/2008 | |
| JP | 2008-210794 A | 9/2008 | |
| JP | 2009-087648 A | 4/2009 | |
| JP | 4490267 B2 | 6/2010 | |
| JP | 2010-240936 A | 10/2010 | |
| JP | 4651006 B2 | 12/2010 | |
| JP | 2011-210701 A | 10/2011 | |
| JP | 2012-138250 A | 7/2012 | |
| JP | 2012-160279 A | 8/2012 | |
| KR | 2008-0073371 A | 8/2008 | |
| KR | 2010-0024358 A | 3/2010 | |
| WO | 01/067536 A1 | 9/2001 | |
| WO | 2004/021476 A1 | 3/2004 | |
| WO | 2007/086429 A1 | 8/2007 | |
| WO | 2008/149986 A1 | 12/2008 | |
| WO | 2009/096451 A1 | 8/2009 | |
| WO | 2010/134585 A1 | 11/2010 | |
| WO | 2010/143677 A1 | 12/2010 | |
| WO | 2011/021668 A1 | 2/2011 | |
| WO | 2013/151134 A1 | 10/2013 | |

OTHER PUBLICATIONS

International Search Report issued in corresponding International Patent Application No. PCT/JP2013/075049 dated Nov. 19, 2013.
International Preliminary Report on Patentability and Written Opinion issued in corresponding International Patent Application No. PCT/JP2013/075049 dated Mar. 24, 2015.
European Search Report issued in corresponding European Patent Application No. 13838737.8 dated Feb. 8, 2016.
Wang et al., "Wet-laid non-woven fabric for separator of lithium-ion battery," Journal of Power Sources, 189: 616-619 (2009).
Advanced Batteries and Materials, Kyoritsu Shuppan Co., Ltd., 52, 53, 92 (Jul. 25, 2012) (see partial translation).
Next-generation lithium secondary batteries, NTS Inc., 119, 120, 421 (2003) (see partial translation).

* cited by examiner

SEPARATOR AND METHOD OF PREPARING THE SAME, AND LITHIUM ION SECONDARY BATTERY

TECHNICAL FIELD

The present invention relates to a separator, a method of preparing a separator, and a lithium ion secondary battery.

BACKGROUND ART

A variety of electrochemical devices have been used with recent development of electronic techniques and an increase in concerns about environmental techniques. In particular, a demand for energy savings has been increased, and products contributing to energy savings have been increasingly expected. Examples of such products include solar batteries as power generating devices, and secondary batteries, capacitors, and condensers as electrical storage devices. Typical examples of the electrical storage devices, i.e., lithium ion secondary battery have been used mainly as rechargeable batteries for portable devices. These batteries also have been expected in applications to batteries for hybrid electric vehicles and electric vehicles.

In general, the lithium ion secondary battery includes a positive electrode, a negative electrode, and a separator interposed therebetween, the positive electrode and the negative electrode mainly composed of an active material that can dope and dedope lithium, respectively. In the lithium ion secondary battery, the positive electrode includes a positive electrode current collector formed of aluminum or the like and coated with a positive electrode mixture comprising a positive electrode active material such as $LiCoO_2$, $LiNiO_2$, or $LiMn_2O_4$, a conductive agent such as carbon black or graphite, a binder such as polyvinylidene fluoride, and latex or rubber. The negative electrode includes a negative electrode current collector formed of copper or the like and coated with a negative electrode mixture comprising a negative electrode active material such as coke or graphite, a binder such as polyvinylidene fluoride, and latex or rubber. The separator is formed of a microporous membrane of a synthetic resin such as porous polyolefin. The separator is very thin, and has a thickness of several micrometers to several hundred micrometers. The positive electrode, the negative electrode, and the separator are impregnated with an electrolytic solution inside the battery. Examples of the electrolytic solution include electrolytic solutions prepared by dissolving a lithium salt such as $LiPF_6$ or $LiBF_4$ in an aprotic solvent such as propylene carbonate or ethylene carbonate or a polymer such as polyethylene oxide.

The lithium ion secondary batteries are mainly used as rechargeable batteries for portable devices (for example, see Patent Document 1). The lithium ion secondary batteries are also expected to be broadly developed as batteries in applications to vehicles such as hybrid electric vehicles and electric vehicles. To broaden the applications of the lithium ion secondary batteries, the batteries should be reduced in size and increased in its performance. One of such approaches is an improvement in the separator. Synthetic resin microporous membranes are now mainly used as a separator for the lithium ion secondary battery for portable devices. The synthetic resin microporous membranes, which are highly reliable membranes, need further improvements in capacity, current density, heat resistance, and cost for use as a separator for lithium ion secondary battery for vehicles.

As attempts to enhance these performances, it is suggested to use separators formed of nonwoven fabrics or paper (for example, see Patent Documents 2 and 3). Moreover, methods of enhancing performances of separators formed of nonwoven fabrics have been examined. For example, as technique of preventing short circuit of a separator caused by thermal shrinkage, Patent Document 4 discloses a slurry for forming an insulating layer having insulating particles dispersed therein, and a separator prepared by applying the slurry to a porous substrate. Furthermore, as techniques of enhancing resistance to short circuit and rate characteristics, Patent Document 5 discloses a separator for a battery comprising a fibrous material and non-deformable inorganic fine particles, and Patent Document 6 discloses a separator including a support having pores and a porous ceramic material charged into the pores of the support.

The nonwoven fabrics and paper are promising as materials for a separator because porous membranes allowing higher capacity of the battery can be prepared at low process cost using materials having high heat resistance (for example, see Patent Document 7). Patent Document 7 describes a polyvinylidene fluoride (PVdF) polymer porous membrane including a polyethylene terephthalate (PET) nonwoven fabric as a substrate as one of suitable forms of separators. The separators in this form have high safety during overcharge, high heat resistance, and low cost.

When a short circuit is locally caused by an external factor, a separator may shrink or melt to increase areas having short circuit and generate risky states such as ignition of the battery. To prevent this, techniques of containing inorganic particles in a separator have been reported (for example, see Patent Document 9).

In typical lithium ion secondary battery, an electrolytic solution having a composition comprising an $LiPF_6$ dissolved in a carbonate solvent is used from the viewpoint of ion conductivity. Here, a typical carbonate solvent is a mixed solvent of a cyclic carbonate such as ethylene carbonate (EC) and a linear carbonate such as diethyl carbonate (DEC).

A combination of a separator comprising the PET nonwoven fabric above with such an electrolytic solution leads to bad preservation properties at high temperatures. Then, to solve the problem, Patent Document 8 has suggested techniques of adding vinylene carbonate (VC) to the electrolytic solution.

CITATION LIST

Patent Documents

Patent Document 1: Japanese Patent Application Laid-Open No. 2009-087648
Patent Document 2: Japanese Patent Application Laid-Open No. 2005-159283
Patent Document 3: Japanese Patent Application Laid-Open No. 2005-293891
Patent Document 4: WO2009/096451
Patent Document 5: Japanese Patent Application Laid-Open No. 2008-210548
Patent Document 6: Japanese Patent No. 4651006
Patent Document 7: WO01/67536
Patent Document 8: Japanese Patent Application Laid-Open No. 2003-187867
Patent Document 9: Japanese Patent No. 4490267

SUMMARY OF INVENTION

Technical Problem

Unfortunately, when such a nonwoven fabric is used as it is as a separator, short circuit caused by contact between positive and negative electrodes or generation of lithium dendrites cannot be sufficiently prevented due to its excessively large pore size of the nonwoven fabric. Use of the nonwoven fabric separators described in Patent Documents 4 and 6 suppress short circuit while permeability of ions reduces and the discharge capacity at a high rate reduces. Furthermore, Patent Document 5 describes an improvement in resistance to short circuit and high rate characteristics as the effects. However, in Examples, only the results of the capacity retention at a low discharge rate are shown, and those effects are not sufficiently demonstrated.

Furthermore, it was found out that the techniques described in Patent Document 8 have an effect of suppressing the decomposition reaction of the separator comprising a PET nonwoven fabric by adding VC in the electrolytic solution but an insufficient effect of suppressing short circuit. Use of separators described in Patent Documents 2, 3, and 7 results in generation of short circuit, growth of dendrites, and a variety of unstable charge and discharge behaviors. These reveal problems in reliability and safety of the performance of the separator. Furthermore, Patent Document 3 also reveals a problem in heat resistance, and specifically the shape of the PET nonwoven fabric is not kept after a high temperature preservation test due to a reaction of $LiPF_6$ with the PET nonwoven fabric in portions of the negative electrode not facing the positive electrode. Patent Document 9 describes a separator containing inorganic particles on a nonwoven fabric substrate and in a substrate while description of decomposition of the PET nonwoven fabric is not found.

Accordingly, the present invention has been made in consideration of such circumstances. An object of the present invention is to provide a separator for an electrochemical element maintaining high rate characteristics and enabling suppression of short circuit, a method of preparing the separator, and a lithium ion secondary battery including the separator for an electrochemical element. Another object of the present invention is to provide a separator comprising a nonwoven fabric enabling a higher capacity of a battery, and attaining a lithium ion secondary battery exhibiting stable charge and discharge behaviors while the shape of the separator is sufficiently kept, and a lithium ion secondary battery.

Solution to Problem

The present inventors have conducted extensive research to achieve these goals, and have found that the discharge capacity at a high rate is kept and short circuit can be suppressed by a separator containing inorganic particles having a specific particle size distribution in combination with a substrate having a specific pore structure. Furthermore, the present inventors have conducted research on a variety of nonwoven fabrics, and have found that use of sheath-core composite fibers having a specific configuration can attain a lithium ion secondary battery exhibiting stable charge and discharge behaviors while the shape of the separator is sufficiently kept. Then, based on these findings, the present inventors have completed the present invention.

Namely, the present invention is as follows.

[1] A separator comprising a substrate having an inner surface and an outer surface, and inorganic particles present on the outer surface and the inner surface of the substrate, wherein the substrate has a porosity of 55% or more and a mean flow pore size of 30 μm or less, the inorganic particles have an average particle size of 1.0 to 4.0 μm, and the inorganic particles comprise 40% by volume or less of particles having a particle size of 1.0 μm or less and 30 to 75% by volume of particles having a particle size of 2.0 μm or more.

[2] The separator according to the above [1], wherein the substrate comprises a nonwoven fabric containing one or more resins selected from the group consisting of polyolefin-based resins and polyester-based resins.

[3] The separator according to the above [2], wherein the substrate comprises a laminated nonwoven fabric comprising a first nonwoven fabric layer comprising fibers having a fiber diameter of 4.0 μm or less and a second nonwoven fabric layer comprising fibers having a fiber diameter of more than 4.0 μm and 30.0 μm or less.

[4] The separator according to any one of the above [1] to [3], further comprising 4 parts by mass or more of a binder based on 100 parts by mass of the inorganic particles, the binder being present inside the substrate.

[5] A separator comprising a substrate having an inner surface and an outer surface, and inorganic particles present on the outer surface and the inner surface of the substrate, wherein the substrate comprises a laminated nonwoven fabric formed by laminating a plurality of nonwoven fabric layers, and the separator has a porosity of 45 to 70%, a pore size distribution of the separator has one or more local maximum values in the range of a pore size of 0.1 to 1 μm and one or more local maximum values in the range of a pore size of 1 to 10 μm.

[6] A method of preparing the separator according to any one of the above [1] to [5], the method comprising the steps of:

dispersing inorganic particles in a dispersive medium to prepare a slurry, applying the slurry to a substrate or impregnating a substrate with the slurry to prepare a substrate with the slurry, and drying the substrate with the slurry, wherein the substrate has a porosity of 55% or more and a mean flow pore size of 30 μm or less, the inorganic particles have the average particle size of 1.0 to 4.0 μm or less, and the inorganic particles comprise 40% by volume or less of particles having a particle size of 1.0 μm or less and 30 to 75% by volume of particles having a particle size of 2.0 μm or more.

[7] A separator, comprising a nonwoven fabric membrane comprising sheath-core composite fibers in which a sheath portion comprises a polyolefin-based resin and a core portion comprises a polyester-based resin.

[8] The separator according to the above [7], wherein the composite fibers have a fiber diameter of 30 μm or less.

[9] The separator according to the above [7] or [8], further comprising inorganic particles and a resin binder.

[10] The separator according to the above [9], wherein the inorganic particles have the average particle size of 1 to 4 μm.

[11] The separator according to any one of the above [1] to [5], [9] and [10], wherein the inorganic particles have a plate-like shape.

[12] The separator according to any one of the above [7] to [11], wherein the polyolefin-based resins include polypropylene.

[13] The separator according to any one of the above [7] to [12], wherein the polyester-based resins include polyethylene terephthalate.

[14] The separator according to any one of the above [7] to [13], wherein the nonwoven fabric membrane comprises a laminated nonwoven fabric comprising a first nonwoven fabric layer comprising fibers having a fiber diameter of 4.0 µm or less and a second nonwoven fabric layer containing the composite fibers having a fiber diameter of more than 4.0 µm and 30.0 µm or less.

[15] The separator according to the above [14], wherein in the laminated nonwoven fabric, the first nonwoven fabric layer is interposed between two or more of the second nonwoven fabric layers.

[16] The separator according to the above [14] or [15], wherein the first nonwoven fabric layer is formed by a melt blown method.

[17] The separator according to any one of the above [7] to [16], wherein the nonwoven fabric membrane has a thickness of 10 to 60 µm.

[18] The separator according to any one of the above [7] to [17], wherein the nonwoven fabric membrane is calendered.

[19] The separator according to any one of the above [1] to [5] and [7] to [18], wherein the separator is used for an electrochemical element.

[20] A lithium ion secondary battery, comprising a positive electrode, a negative electrode, an electrolytic solution, and the separator according to any one of the above [1] to [5] and [7] to [19].

[21] The lithium ion secondary battery according to the above [20], wherein the electrolytic solution contains at least one compound selected from the group consisting of carbonate esters having carbon-carbon double bond, cyclic carbonates having a fluorine atom, and sulfones.

[22] The lithium ion secondary battery according to the above [21], wherein the carbonate esters having carbon-carbon double bond include vinylene carbonate, the cyclic carbonates having a fluorine atom include fluoroethylene carbonate, and the sulfones include sulfolane.

Advantageous Effects of Invention

The present invention can provide a separator maintaining high rate characteristics and enabling suppression of short circuit, a method of preparing the separator, and a lithium ion secondary battery including the separator. The present invention also can provide a separator comprising a nonwoven fabric having a sheath-core structure to sufficiently keep the shape of the separator and attain a lithium ion secondary battery exhibiting stable charge and discharge behaviors, and a lithium ion secondary battery.

DESCRIPTION OF EMBODIMENTS

Figure 1:
FIG. 1 is a conceptual diagram showing an example of a laminated nonwoven fabric.

Embodiments for implementing the present invention (hereinafter simply referred to as "Embodiments") will now be described in detail. The separator according to First Embodiment comprises a substrate having an inner surface and an outer surface, and inorganic particles present on the outer surface and the inner surface of the substrate. The separator can be prepared using the inorganic particle-dispersed slurry below as one starting material. The substrate having an inner surface and an outer surface is a substrate having spaces (such as pores and gaps) inside the substrate. The "inner surface" refers to an interface between the spaces inside the substrate and a solid forming the substrate. The "outer surface" refers to an interface between the spaces outside the substrate and the solid forming the substrate.

(Inorganic Particle-Dispersed Slurry)

The inorganic particle-dispersed slurry according to the present embodiment contains inorganic particles and a dispersive medium. The inorganic particles are dispersed in the dispersive medium in the slurry, and have an average particle size of 1.0 to 4.0 µm in the slurry. The inorganic particles have a particle size distribution in which 40% by volume or less of particles having a particle size of 1.0 µm or less and 30 to 75% by volume of particles having a particle size of 2.0 µm or more are contained.

At an average particle size of the inorganic particles of 1.0 µm or more in the slurry, ion permeability in a layer containing the inorganic particles can be more effectively maintained, and the discharge capacity at a high rate can be more effectively maintained. At an average particle size of 4.0 µm or less, the density of the layer containing the inorganic particles can be more effectively maintained and generation of short circuit can be suppressed more significantly. The average particle size is more preferably 1.2 to 4.0 µm, still more preferably 1.5 to 4.0 µm. At an average particle size in such a range, a reduction in the discharge capacity at a high rate is suppressed more significantly.

In the slurry, the inorganic particles preferably contain 40% by volume or less of particles having a particle size of 1.0 µm or less and 30 to 75% by volume of particles having a particle size of 2.0 µm or more. At such a particle size distribution, a reduction in the discharge capacity at a high rate can be more effectively suppressed. From the same viewpoint, the inorganic particles in the slurry contain preferably 30% by volume or less, more preferably 25% by volume or less, particularly preferably 20% by volume or less of particles having a particle size of 1.0 µm or less. The lower limit of the content of the particles having a particle size of 1.0 µm or less can be any numeric value, which may be, for example, 10% by volume. From the same viewpoint, the inorganic particles in the slurry contain more preferably 45 to 75% by volume, and still more preferably 50 to 75% by volume of particles having a particle size of 2.0 µm or more.

In the specification, the particle size distribution and the average particle size of the inorganic particles in the slurry are determined as follows. Namely, distilled water is added to a prepared slurry, and is stirred to adjust the concentration of the inorganic particles to be 0.01% by mass. Then, a particle size distribution in terms of volume is determined by measuring with a laser particle size distribution analyzer (available from SHIMADZU CORPORATION, SALD- 2100). From its cumulative frequency, the average particle size, the content of the particles having a particle size of 1.0 µm or less, and the content of the particles having a particle size of 2.0 µm or more can be determined. According to the method above, a particle size (d10) having a cumulative frequency of 10% and a particle size (d30) having a cumulative frequency of 30% can be determined.

Any inorganic particles can be dispersed in the slurry. Non-conductive inorganic particles are preferable. Inorganic particles chemically and electrochemically stable to a material forming an electrochemical element are preferable.

As such inorganic particles, any synthetic products and natural products can be used. Examples of the inorganic particles include ceramics and glass fibers of oxide ceramics such as alumina such as gibbsite, bayerite, boehmite, and corundum, silica, titania, zirconia, magnesia, ceria, yttria, zinc oxide, and iron oxide; nitride ceramics such as silicon nitride, titanium nitride, and boron nitride; silicon carbide, calcium carbonate, aluminum sulfate, aluminum hydroxide, magnesium hydroxide, potassium titanate, talc, synthetic kaolinite, kaolin clay, kaolinite, fraipontite, stevensite, dickite, nacrite, halloysite, pyrophyllite, odinite, montmorillonite, beidellite, nontronite, volkonskoite, saponite, hectorite, fluorine hectorite, sauconite, swinefordite, vermiculite, fluorine vermiculite, berthierine, sericite, amesite, kellyite, fraiponite, brindleyite, bentonite, zeolite, biotite, phlogopite, fluorine phlogopite, annite, eastonite, tainiolite, siderophyllite tetra-ferri-annite, lepidolite, tetrasilicic fluoromica, polylithionite, muscovite, celadonite, ferroceladonite, ferroaluminoceladonite, aluminoceladonite, tobelite, paragonite, clintonite, kinoshitalite, bityite, anandite, margarite, clinochlore, chamosite, pennantite, nimite, baileychlore, donbassite, cookeite, sudoite, hydrotalcite, calcium silicate, magnesium silicate, aluminum silicate, diatomite, and quartz sand. These inorganic particles are used alone or in combination. From the viewpoint of electrochemical stability, inorganic oxides such as aluminum oxide, boehmite, calcined kaolin, titanium oxide, zinc oxide, and magnesium oxide are preferable as the inorganic particles. From the viewpoint of a higher porosity, flat inorganic particles such as boehmite and calcined kaolin are more preferable. From the viewpoint of cost, calcined kaolin is more preferable.

Calcined kaolin is prepared by calcining kaolin mainly composed of kaolin mineral such as kaolinite or agalmatolite mainly composed of pyrophyllite. Since crystallization water is released and impurities are removed during calcination, calcined kaolin is preferable from the viewpoint of chemical stability in the electrochemical element, particularly electrochemical stability.

A preferable dispersive medium for the inorganic particles is those that can disperse the inorganic particles more homogeneously and stably. Examples of such a dispersive medium for the inorganic particles include N-methyl pyrrolidone, N,N-dimethylformamide, N,N-dimethylacetamide, water, ethanol, toluene, hot xylene, methylene chloride, and hexane. Among these, water is preferable from the viewpoint of environmental protection.

The inorganic particle-dispersed slurry according to the present embodiment can contain a binder to bind inorganic particles each other and fix the inorganic particles to the substrate when the inorganic particles are contained in the separator. Any binder can be used without limitation. Binders insoluble in the electrolytic solution for an electrochemical element and having electrochemical stability are preferably used. For example, resin binders are preferable.

Specific examples of such resin binders include polyolefin-based resins such as polyethylene, polypropylene, polybutene, and copolymers thereof and modified polyolefin-based resins such as chlorinated or acid-modified polyolefin-based resins; fluorine-containing resins such as polyvinylidene fluoride and polytetrafluoroethylene; fluorine-containing rubbers such as vinylidene fluoride-hexafluoropropylene-tetrafluoroethylene copolymers and ethylene-tetrafluoroethylene copolymers; rubbers such as (meth)acrylic acid-styrene-butadiene copolymers and hydrides thereof, acrylonitrile-butadiene copolymers and hydrides thereof, acrylonitrile-butadiene-styrene copolymers and hydrides thereof, methacrylic acid ester-acrylic acid ester copolymers, styrene-acrylic acid ester copolymers, acrylonitrile-acrylic acid ester copolymers, ethylene propylene rubber, polyvinyl alcohol, and polyvinyl acetate; cellulose derivative such as ethyl cellulose, methyl cellulose, hydroxyethyl cellulose, and carboxymethyl cellulose; and resins having a melting point and/or a glass transition temperature of 180° C. or more such as polyphenylene ether, polysulfone, polyethersulfone, polyphenylene sulfide, polyether imide, polyamidimide, polyamide, and polyester. These resin binders are used alone or in combination. Among these, the resin binder is preferably (meth)acrylic acid copolymers, particularly more preferably (meth)acrylic acid copolymers having self-crosslinking properties. The binder is not limited to those listed above. A plurality of binders may be used in combination.

The content of the inorganic particles contained in the slurry is preferably 5 to 70% by mass, more preferably 10 to 60% by mass from the viewpoint of the viscosity and applicability of the slurry and a reduction in the step of drying the slurry.

The content of the binder contained in the inorganic particle-dispersed slurry is preferably 1 part by mass or more, more preferably 4 parts by mass or more, still more preferably 6 parts by mass or more based on 100 parts by mass of the inorganic particles because the binding and fixing effects of the binder are more effectively demonstrated. The content of the binder to be contained is preferably 25 parts by mass or less, more preferably 15 parts by mass or less based on 100 parts by mass of the inorganic particles because a reduction in permeability of ions and a reduction in properties of the electrochemical element caused by gaps inside the substrate filled with the binder are more effectively suppressed.

To stabilize the dispersion of the inorganic particles and enhance applicability, the slurry can contain a variety of additives such as dispersants such as surfactants; thickeners; wetting agents; antifoaming agents; preservative agents and bactericide; and pH adjusters containing acids and alkalis. Preferably, these additives are removable during the removal of the solvent. The additives electrochemically stable in the range of use of the electrochemical element without inhibiting the battery reaction and stable up to approximately 200° C. may remain in the separator.

For the dispersants such as surfactants, a variety of surfactants can be used, for example: anionic surfactants such as sulfuric acid ester surfactants, phosphoric acid ester surfactants, carboxylic acid surfactants, and sulfonic acid surfactants; cationic active agents such as quaternary ammonium salt surfactants and amideamine surfactants; amphoteric surfactants such as alkylbetaine surfactants, amide betaine surfactants, and amine oxide surfactants; nonionic surfactants such as ether surfactants, fatty acid ester surfactants, and alkyl glucoxide; and polymer surfactants such as polyacrylic acid, polyacrylic acid salts, polysulfonic acid salts, polynaphthalene sulfonic acid salts, polyalkylene polyamine alkylene oxide, polyalkylene polyimine alkylene oxide, polyvinylpyrrolidone, and cellulose surfactants. These are used alone or in combination to prevent aggregation of the fillers. Any dispersant that attains the same effect as above can be used without limitation.

Furthermore, to control the interface tension, alcohol such as methyl alcohol, ethyl alcohol, isopropyl alcohol, ethylene glycol, and propylene glycol, or ether such as monomethyl acetate can be added to the slurry. These are used alone or in combination. The additives are not limited to those listed above, and any additive for controlling interface tension that attains the same effect as above can be used without limitation.

Examples of thickeners include synthetic polymers such as polyethylene glycol, urethane modified polyether, polyacrylic acid, polyvinyl alcohol, vinyl methyl ether-maleic anhydride copolymers; cellulose derivatives such as carbomethoxy cellulose, hydroxyethyl cellulose, and hydroxypropyl cellulose; natural polysaccharides such as xanthan gum, diutan gum, welan gum, gellan gum, guar gum, and carrageenan gum; and starches such as dextrin and alphaized starch. The thickener is properly selected from the viewpoint of the viscosity of the slurry, pot life, and particle size distribution. These are used alone or in combination. The thickeners are not limited to those listed above, and any thickener that attains the same effect as above can be used without limitation.

When the substrate is a nonwoven fabric, a wetting agent can be added to the slurry to enhance wettability of the nonwoven fabric to fibers (such as synthetic fibers) of the fabric and suppress pin holes. As the wetting agent, aliphatic polyether nonionic surfactants, polyoxyalkylene nonionic surfactants, modified silicone, modified polyether, and dimethylsiloxane polyoxyalkylene copolymers can be used. These are used alone or in combination. The wetting agents are not limited to those listed above, and any wetting agent that attains the same effect as above can be used without limitation.

For the antifoaming agent, a variety of antifoaming agents such as mineral oil antifoaming agents, silicone antifoaming agents, acrylic antifoaming agents, and polyether antifoaming agents can be used. These are used alone or in combination. The antifoaming agents are not limited to those listed above, and any antifoaming agent that attains the same effect as above can be used without limitation.

In the present embodiment, the inorganic particles can be dispersed in a dispersive medium or a solvent to prepare a slurry. The inorganic particles and the binder can be dissolved or dispersed in a solvent for a slurry by any method that can attain the dissolving or dispersing properties of the slurry needed for application of the slurry onto the substrate or the like. Examples of the dissolving or dispersing method include mechanical stirring with ball mills, bead mills, planetary ball mills, vibration ball mills, sand mills, colloid mills, Attritors, roll mills, high-speed impeller dispersing machines, dispersers, homogenizers, ultrasonic homogenizers, pressure homogenizers, ultra-high pressure homogenizers, high-speed homogenizers, high-speed impact mills, thin film rotary high-speed mixers, ultrasonic dispersers, and stirring blades.

(Separator and Method of Preparing Separator)

The separator according to the present embodiment is suitably used as a separator for an electrochemical element included in an electrochemical element. The separator for an electrochemical element (hereinafter also simply referred to as a "separator") is prepared by a method comprising a step of applying the inorganic particle-dispersed slurry to the substrate having an outer surface and an inner surface or impregnating such a substrate with the inorganic particle-dispersed slurry to prepare a substrate with the slurry, and a step of drying the substrate with the slurry. As a result, the separator comprises the substrate and the inorganic particles on the outer surface and the inner surface of the substrate. Accordingly, the inorganic particles in the separator according to the present embodiment have the same average particle size and particle size distribution as above.

The average particle size and particle size distribution of inorganic particles of the separator can be obtained by observing an SEM photograph of the surface of the separator after application and drying to determine size and number of particles thereon.

The substrate having an outer surface and an inner surface has a porosity of preferably 55% or more, more preferably 58% or more from the viewpoint of maintenance of ion permeability and the discharge capacity at a high rate. The upper limit of the porosity can be any numeric value, which is, for example, 80%. The substrate has a mean flow pore size of preferably 30 µm or less, more preferably 20 µm or less from the viewpoint of prevention of short circuit. The lower limit of the mean flow pore size can be any numeric value, which is, for example, 0.1 µm.

The substrate having an outer surface and an inner surface is preferably a nonwoven fabric because the objects of the present invention can be more effectively and surely attained. The nonwoven fabric can be formed of any material having electric insulation properties, and stability to the electrochemical reaction within the electrochemical element and stability to an electrolytic solution. Examples of the material for the nonwoven fabric include ceramics, glass, resin, and cellulose. The resin may be a synthetic resin or a natural resin (natural polymer), or may be an organic resin or an inorganic resin. Organic resins are preferable because these attain high performance as a substrate. Examples of the organic resins include polyolefin-based resins, polyester-based resins, polyphenylene sulfide-based resins, polyamide-based resins, polyimide-based resins, and liquid crystal polyesters and aramides. The materials for the nonwoven fabric are preferably polyester-based resins and polyolefin-based resins from the viewpoint of high heat resistance, handling properties, cost, and processability. Examples of materials for polyester-based resins include polyethylene terephthalate (PET)-based resins, polybutylene terephthalate (PBT)-based resins, and polyethylene naphthalate (PEN)-based resins. Examples of polyolefin-based resins include polyolefin-based resins such as polyethylene resin, polypropylene resin, and polyethylene/polypropylene copolymers.

Among these materials, when a resin is used, a resin of a homopolymer may be used or a resin of a copolymer may be used. A mixture of several resins and an alloy thereof may be used. In the present embodiment, the term "-based resin" indicates a concept that all of the repeating units forming the resin have a basic skeleton structure. For example, a polyester-based resin indicates a resin having an ester structure as a basic skeleton in all of the repeating units forming the resin.

The method of preparing a nonwoven fabric according to the present embodiment is not limited in particular. A method of preparing a nonwoven fabric comprising "microfibers" (nonwoven fabric layer) described later may be preferably a dry-type method or a wet-type method using microfibers, or electrospinning and a melt blown method. The nonwoven fabric is prepared more preferably by a melt blown method because a dense nonwoven fabric comprising microfibers can be prepared readily.

The nonwoven fabric preferably has at least one layer including a nonwoven fabric layer comprising fibers having a fiber diameter of 30 μm or less, preferably 0.1 to 30 μm. The nonwoven fabric may be a single layer of a nonwoven fabric layer containing such fibers. The nonwoven fabric may have a laminated structure of a nonwoven fabric layer comprising fibers having a fiber diameter of 30 μm or less and a nonwoven fabric layer comprising fibers having a fiber diameter of more than 30 μm (hereinafter also referred to as a "laminated nonwoven fabric"). To more effectively and surely suppress short circuit and attain an electrochemical element with a higher output, diffusion of ions by fibers having a larger fiber diameter should be prevented as much as possible. From this viewpoint, the substrate preferably includes a first nonwoven fabric layer comprising fibers having a fiber diameter of 4.0 μm or less, preferably 1.0 to 4.0 μm (hereinafter also referred to as a "nonwoven fabric layer (I)"). The fibers having a fiber diameter of 4.0 μm or less is now expressed as "microfibers."

The fibers having a fiber diameter of 4 μm or less can prevent unevenness or an excessive increase in gaps between the fibers in the nonwoven fabric layer. Thereby, a dense and uniform nonwoven fabric layer can be formed. The fibers having a fiber diameter of 0.1 μm or more can be readily formed, and the formed fibers can be prevented from generating scuffing or lint by surface friction or the like.

When the slurry containing the inorganic particles is applied to the nonwoven fabric (described in detail later), the nonwoven fabric comprising the microfibers can prevent deficits of the nonwoven fabric layer caused by friction during application. Furthermore, to prevent the inorganic particles from bleeding through to the rear surface (bleed through) during application, the nonwoven fabric layer (I) formed of the microfibers enables the inorganic particles to be suitably filled into the nonwoven fabric. For this reason, in the separator according to the present embodiment, the inorganic particles can be densely filled into the laminated nonwoven fabric. When the slurry is applied at a small basis weight, inner short circuit can be more effectively suppressed. The permeability of the electrolyte can be enhanced if the slurry is applied such that the content of the inorganic particles is reduced in the separator. For this reason, a battery including the separator according to the present embodiment can attain improved performance of the battery. Namely, if the slurry containing the inorganic particles is applied to the nonwoven fabric or the nonwoven fabric is impregnated with the slurry according to the present embodiment, a layer containing inorganic particles and having high properties as a separator can be attained. In the separator according to the present embodiment, even if a small amount of the slurry is applied and the content of the inorganic particles is small, pin holes caused by application failure can be suppressed, therefor ensuring safety during use of the separator and high performance more effectively.

The nonwoven fabric layer (I) may contain fibers other than microfibers in the range so as not to inhibit the achievement of the objects of the present invention. The nonwoven fabric layer (I) contains preferably 50% or more, more preferably 80% or more, still more preferably 90% or more of the microfibers in terms of mass, and particularly preferably is composed of only the microfibers. The microfibers contained in the nonwoven fabric layer (I) have a fiber diameter of preferably 0.3 to 4 μm, more preferably 0.3 to 3.5 μm, still more preferably 0.5 to 3 μm, particularly preferably 0.5 to 1 μm. At a fiber diameter of 0.5 to 1 μm, an electrochemical element including the nonwoven fabric layer (I) containing such fibers can have higher performance.

The "fiber diameter" in the specification is a fiber diameter measured with a microscope, and more specifically measured according to the following method.

The nonwoven fabric prepared by spunbonding or a wet-type method is formed of fibers having a large fiber diameter, i.e., usually about a dozen micrometers. For this reason, such a nonwoven fabric, if used in the separator for an electrochemical element, will readily cause short circuit. In contrast, a nonwoven fabric prepared by a melt blown method is formed of fibers having a fiber diameter smaller than that of fibers contained in the nonwoven fabric prepared by spunbonding or a wet-type method. Accordingly, short circuit barely occur.

When the substrate is a laminated nonwoven fabric including the nonwoven fabric layer (I) and a nonwoven fabric layer other than the layer (I), the nonwoven fabric layer other than the layer (I) (hereinafter also referred to as a "nonwoven fabric layer (II)") can be prepared by any method, preferably by spunbonding, a dry-type method, and a wet-type method. When spunbonding is used, any process can be used without limitation. To enhance the uniformity of a web, for example, if a process of charging fibers in a corona charging channel device disclosed in Japanese Patent Application Laid-Open No. 11-131355, or a process of opening a web by adjusting the distribution of the rate of the air stream of an ejector with an apparatus for controlling the air stream such as a flat dispersion plate, and laminating the fibers onto a collecting surface while scattering of the web being suppressed, spunbonding is a more preferable method. From the viewpoint of enhancement of mechanical strength as the substrate, the nonwoven fabric layer (II) is preferably a nonwoven fabric layer prepared by spunbonding.

The nonwoven fabric layer (II) preferably has a fiber diameter of more than 4.0 μm and 30.0 μm or less. At a fiber diameter of 30.0 μm or less, the fibers can have a diameter not excessively large and have a more uniform distance between fibers. For this reason, a denser and more uniform nonwoven fabric layer can be formed. At a fiber diameter of fibers of more than 4.0 μm in the nonwoven fabric layer (II), the substrate can have more sufficient mechanical strength. From the same viewpoint, the fibers contained in the nonwoven fabric layer (II) have a fiber diameter of more preferably 6.0 to 25.0 μm, more preferably 8.0 to 20.0 μm, particularly preferably 9.0 to 15.0 μm.

The laminated nonwoven fabric preferably has a structure in which the nonwoven fabric layer (I) is interposed between two nonwoven fabric layers (II). As described above, the nonwoven fabric layer (I) has an effect of suppressing bleed through of the inorganic particles during application of the slurry. If the nonwoven fabric layer (I) comprising the microfibers is disposed between the two nonwoven fabric layers (II) in the laminated structure, the slurry applied to one of the nonwoven fabric layers (II) is prevented from permeating through the nonwoven fabric layer (I) into the other nonwoven fabric layer (II). Accordingly, a component contained in the slurry such as the inorganic particles is suitably kept inside one of the nonwoven fabric layers (II). As a result, if slurries containing different components are applied to the two nonwoven fabric layers (II), respectively, the different components can be kept in the nonwoven fabric layers (II), respectively. Thereby, different components suitable as components for the respective electrodes of the battery (such as the inorganic particles) can be applied to the nonwoven fabric layers (II), respectively.

In a more preferable embodiment, the laminated nonwoven fabric is composed of a three-layer structure formed of two types of layers. More preferably, the three-layer structure has a structure of the nonwoven fabric layer (II), the nonwoven fabric layer (I), and the nonwoven fabric layer (II) laminated in this order. The microfibers contained in the nonwoven fabric layer (I) have a fiber diameter of preferably 0.1 μm or more and less than 4.0 μm, and the fibers contained in the nonwoven fabric layer (II) have a fiber diameter of preferably 4.0 μm or more and 30.0 μm or less.

The fibers contained in the nonwoven fabric layer (II) are preferably thermoplastic resin fibers. The thermoplastic resins have high processability by heat. If a thermoplastic resin fiber is formed into a nonwoven fabric, the resulting nonwoven fabric can readily attain a desired thickness and mechanical strength by calendering.

The separator according to the present embodiment has a thickness of preferably 10 to 60 μm, more preferably 10 to 50 μm. The thickness of the separator is preferably 10 μm or more to attain mechanical strength and suppress short circuit more surely. The thickness of the separator is preferably 60 μm or less to enhance the output density as the electrochemical element and suppress a reduction in energy density.

In the present embodiment, the nonwoven fabric preferably has a thickness of 10 to 50 μm. A nonwoven fabric having a thickness of 10 μm or more will have higher strength when slit to have a short width, and will reduce a deficit rate of slitting. At a thickness of 10 μm or more, the interval between the electrodes can be more sufficiently ensured during production of a battery or a capacitor to suppress physical contact between the electrodes more significantly. At a thickness of the nonwoven fabric of 50 μm or less, the total thickness of a roll of the electrodes and the separator is not excessively large, thereby attaining a compact product as an electronic part. In this sense, the thickness of the nonwoven fabric is more preferably 10 to 30 μm. The thickness in this specification can be measured according to JIS L-1906.

In the present embodiment, the total basis weight of the nonwoven fabric used in the separator is preferably 30 g/m$^2$ or less. At a basis weight of the nonwoven fabric of 30 g/m$^2$ or less, a higher performance of an electrochemical element can be attained. From such a viewpoint, the total basis weight of the nonwoven fabric is more preferably 25 g/m$^2$ or less, still more preferably 20 g/m$^2$ or less. From the viewpoint of mechanical strength, the lower limit of the total basis weight of the nonwoven fabric is preferably 4 g/m$^2$, more preferably 5 g/m$^2$. At a total basis weight of the nonwoven fabric within this range, when the separator should have a predetermined thickness, the basis weight of the nonwoven fabric is not excessively large, gaps between fibers are sufficiently ensured, and the permeability of ions or electrons can be enhanced. Accordingly, a separator having higher performance can be attained. The mechanical strength of the slit nonwoven fabric can be enhanced more significantly, so that resistance to winding after production, tension applied to the fabric during application of the slurry, and the like is enhanced more significantly, and the nonwoven fabric is more readily handled. In this sense, the basis weight of the nonwoven fabric is preferably 5 to 15 g/m$^2$.

In a particularly preferable embodiment, the nonwoven fabric has a total basis weight of 5 to 15 g/m$^2$ and a thickness of 10 to 30 μm.

In the present embodiment, the nonwoven fabric preferably has an apparent density of 0.17 to 0.80 g/cm$^3$. At an apparent density of 0.17 g/cm$^3$ or more, the fibers are contained in the nonwoven fabric at a higher density to suppress breakage of the nonwoven fabric during assembling of a battery or application of the slurry. The nonwoven fabric can have higher resistance to burrs generated in the electrodes to more effectively prevent local short circuit. At an apparent density of 0.80 g/cm$^3$ or less, the fibers are not present excessively densely in the nonwoven fabric. For this reason, inhibition of permeation of an electrolyte by the fibers can be suppressed to prevent a reduction in the performance of the battery. From such a viewpoint, the apparent density is preferably 0.17 to 0.80 g/cm$^3$, more preferably 0.20 to 0.75 g/cm$^3$, still more preferably 0.25 to 0.70 g/cm$^3$.

The basis weight of the nonwoven fabric layer (I) is preferably 15 g/m$^2$ or less. A basis weight of the nonwoven fabric layer (I) of 15 g/m$^2$ or less is more advantageous in suppression of short circuit, and can attain higher performance of an electrochemical element. The basis weight of the nonwoven fabric layer (I) is more preferably 13 g/m$^2$ or less, more preferably 11 g/m$^2$ or less. The lower limit of the basis weight of the nonwoven fabric layer (I) can be any numeric value. The lower limit may be 0.5 g/m$^2$ or 1 g/m$^2$, for example.

The nonwoven fabric used in the separator according to the present embodiment includes the nonwoven fabric layer (I). Thereby, the distance between fibers is small, namely, the pore size is small. Accordingly, a layer having uniform gaps between the fibers is readily formed. From such a viewpoint, the nonwoven fabric used in the separator according to the present embodiment preferably has an average pore size of 0.3 to 30 μm. The average pore size is more preferably 1 to 20 μm or less.

In the separator according to the present embodiment, the nonwoven fabric layer (I) of the microfibers can be disposed inside or on the surface the nonwoven fabric forming the separator. In the nonwoven fabric layer (I), because the fibers have small fiber diameters, gaps between the fibers are small, and the fibers are uniformly distributed. The nonwoven fabric layer (I) has a large specific surface area. The nonwoven fabric layer (I) included in the nonwoven fabric demonstrates high barrier properties due to a dense structure, and enables preparation of a separator attaining high electric insulating properties between electrodes. The microfibers having a large specific surface area attain high retention of the electrolytic solution and high permeability of ions.

In the present embodiment, the nonwoven fabric layer (I) is disposed adjacent to the nonwoven fabric layer (II). Thereby, when the slurry is applied to the laminated nonwoven fabric including both layers, the nonwoven fabric layer (I) suppresses permeation of the inorganic particles contained in the slurry into the rear surface of the nonwoven fabric. Thereby, the inorganic particles can be suitably kept and filled in the nonwoven fabric layer (II), and the slurry can be applied in a suitable form.

In the present embodiment, during application of the slurry, the mean flow pore size of the nonwoven fabric is preferably in the range of 1.5 to 20 μm. If the mean flow pore size indicating the density of the nonwoven fabric is 1.5 μm or more, application failures can be suppressed, which may be caused by a reduction in the air permeability of the nonwoven fabric so that air bubbles mixed during application of the slurry remain inside the nonwoven fabric without being eliminated, and are turned into hollow portions after drying. If the mean flow pore size is 20 μm or less, permeation of the inorganic particles into the rear portion of the substrate and generation of pores on the applied surface during application of the slurry can be suppressed. The mean flow pore size of the nonwoven fabric is more preferably 3.0 to 13 μm, still more preferably 5.0 to 12 μm.

In the present embodiment, a nonwoven fabric layer (II) formed of thermoplastic resin fibers can be disposed as a support layer for reinforcing the nonwoven fabric layer (I). The nonwoven fabric layer (I) may increase internal pressure in the battery due to its relative low air permeability. If the nonwoven fabric layer (II) comprising fibers having a relatively large fiber diameter is combined with the nonwoven fabric layer (I), the air permeability of the laminated nonwoven fabric can be enhanced to attain a separator having high ion permeability. Furthermore, in preparation of a separator, a chemical battery, or a capacitor, the nonwoven fabric layer (II) protects the nonwoven fabric layer (I) against deformation and damage caused by inferior mechanical strength. Accordingly, these can be prepared stably with a low deficit rate.

In the laminated nonwoven fabric, the nonwoven fabric layer (I) is effective in formation of a dense structure while the nonwoven fabric layer (II) is effective in higher stabilization of the laminated nonwoven fabric (namely, improvements in the tensile strength, the bending strength, and the surface abrasion of the laminated nonwoven fabric) and stable maintenance of the nonwoven fabric layer (I) in the respective steps. For these reasons, the laminated nonwoven fabric including the nonwoven fabric layer (I) and the nonwoven fabric layer (II) is advantageous in preparation of a chemical battery or a capacitor having high performance.

In the present embodiment, to prepare a separator with higher performance, a laminated nonwoven fabric composed of three layers is more preferable as a substrate.

In the laminated nonwoven fabric, the ratio of the basis weight (i) of the nonwoven fabric layer (I) to the basis weight (ii) of the nonwoven fabric layer (II) can be any ratio. To give high strength to the laminated nonwoven fabric and form a dense structure having small gaps between the fibers, the ratio of basis weight (i)/basis weight (ii) is preferably 1/10 to 10/1 (the basis weight (i) is the total basis weight of the nonwoven fabric layer (I) and the basis weight (ii) is the total basis weight of the nonwoven fabric layer (II) when two or more nonwoven fabric layers (I) and/or two or more nonwoven fabric layers (II) are present, for example, when the nonwoven fabric layer (II) is disposed as the outermost layers of the laminated nonwoven fabric). At a ratio (i)/(ii) of 1/10 or more, the nonwoven fabric layer (I) is readily formed on the planar direction of the nonwoven fabric without uneven distribution. At a ratio (i)/(ii) of 10/1 or less, the entire laminated nonwoven fabric readily attains high strength so that the nonwoven fabric does not deform during slitting, winding, and heating. The thickness and the basis weight of the laminated nonwoven fabric and those of the respective nonwoven fabric layers forming the laminated nonwoven fabric may be properly selected in the ranges to ensure the thickness and the basis weight needed for the separator.

In the present embodiment, when the fibers contained in the nonwoven fabric layer (II) are a thermoplastic resin fiber, the thermoplastic resin fiber is preferably a thermoplastic synthetic long fiber. In the specification, the thermoplastic synthetic long fiber indicates a continuous long fiber composed of a thermoplastic synthetic resin (for example, polyalkylene terephthalate resins (such as PET, PBT, polytrimethylene terephthalate (PTT)) and derivatives thereof; polyolefin-based resins (such as polyethylene (PE), polypropylene (PP)) and derivatives thereof; polyamide-based resins such as nylon 6 (N6), nylon 66 (N66), and nylon 612 (N612) and derivatives thereof; polyoxymethylene ether-based resins (such as POM); PEN; polyphenylene sulfide (PPS); polyphenylene oxide (PPO); polyketone-based resins such as polyketone resin, and polyether ether ketone (PEEK); thermoplastic polyimide resins such as TPI; or copolymers composed mainly of these resins or resins composed of a mixture thereof). Here, the continuous long fiber indicates a fiber specified in JIS L-0222. The nonwoven fabric composed of a thermoplastic synthetic long fiber can have more sufficient mechanical strength. The nonwoven fabric composed of a thermoplastic synthetic long fiber barely generates lint and has resistance to abrasion when the nonwoven fabric is slit and undergoes friction from the outside. Examples of the thermoplastic synthetic long fiber include long fibers composed of crystalline resins exemplified later. When a short fiber is used as the thermoplastic resin fiber, the crystalline resin can be mixed with a thermoplastic resin having a melting point lower than that of the crystalline resin for use. In the mixing, fibers composed of single-type resins may be mixed with each other, or a single fiber may contain two or more resins having different melting points. For example, a thread having a sheath-core structure composed of a core and a sheath can be used, in which the melting point of the sheath thermoplastic resin is lower than that of the core thermoplastic resin. Examples of such fibers include sheath-core threads comprising a core of PET and a sheath of copolymerized PET, and sheath-core threads comprising a core of PET and a sheath of PP.

The following crystalline resins are preferably used: polyalkylene terephthalate resins (such as PET, PBT, and polytrimethylene terephthalate (PTT)) and derivatives thereof; polyolefin-based resins (such as polyethylene (PE) and polypropylene (PP)) and derivatives thereof; polyamide-based resins such as nylon 6 (N6), nylon 66 (N66), nylon 612 (N612) and derivatives thereof; polyphenylene sulfide (PPS); and polyketone-based resins such as polyether ether ketone (PEEK). These are used alone or in combination.

The "crystalline resin" described in this specification indicates a resin having a degree of crystallinity of 10% or more, which is determined to measure a nonwoven fabric with a differential scanning calorimeter (DSC). In the measurement of the degree of crystallinity with the DSC, the heat of fusion (ΔH) is calculated under measurement conditions where the weight of a sample is 5 mg, the temperature raising rate is 10° C./min, and a scanning temperature is 50 to 300° C., and the degree of crystallinity (Xc) is determined. Xc is determined by the following Formula (1):

$$Xc=(\Delta HTm-\Delta HTcc)/(\Delta H0)\times 100 \qquad (1)$$

Here, Xc is a degree of crystallinity (%), ΔHTm is a heat of fusion (J/g) at melting point, ΔHTcc is heat amount of crystallization (J/g), and ΔH0 is the literature value of the heat of fusion (J/g) when a resin has a degree of crystallinity of 100%.

In the present embodiment, the material forming the nonwoven fabric layer (I) can be any fiber having a fiber diameter of 4.0 μm or less, preferably 0.1 to 4.0 μm. The material may be a thermoplastic resin, or may be a non-thermoplastic material such as cellulose fibril. A thermoplastic resin is also suitable as in the nonwoven fabric layer (II) described above. Specifically, examples thereof include thermoplastic synthetic resins (such as polyalkylene terephthalate resins (such as PET, PBT, and PTT) and derivatives thereof, polyolefin-based resins (such as PE and PP) and derivatives thereof, polyamide-based resins such as N6, N66, and N612 and derivatives thereof, polyoxymethylene ether resins (such as POM), PEN, PPS, PPO, polyketone-based resins such as polyketone resin and PEEK, thermoplastic polyimide resins such as TPI, or copolymers mainly composed of these resins or resins of a mixture thereof. The thermoplastic resin used to form the nonwoven fabric layer (I) may be properly selected according to the purpose of use.

In the present embodiment, the nonwoven fabric layers (I) or the nonwoven fabric layer (I) comprising the microfibers and a nonwoven fabric layer other than the layer (I) (such as the nonwoven fabric layer (II)) can be laminated by any method to form a laminated nonwoven fabric. Examples of the method include a method by thermal bonding layers, a method for making three dimensional entanglement by jetting fast-water stream, and a method of integrating layers with a particulate or fibrous adhesive. Among these, examples of the method of integrating layers by thermal bonding include integration by thermal embossing (thermal embossing roll method) and integration with hot air having a high temperature (air through method). The integration by thermal bonding is preferable because it can keep tensile strength and bending flexibility of nonwoven fabric and heat-resistance stability more effectively.

The integration by thermal bonding is also preferable because a laminated nonwoven fabric including a plurality of nonwoven fabric layers can be prepared without a binder. If a binder is used to integrate nonwoven fabrics into a laminated nonwoven fabric, the binder remains in the separator. The residual binder is not problematic if the binder does not reduce the performance of the electrochemical element. For some binders which reduce the performance of the electrochemical element, an additional step of removing the binder is needed. For these reasons, when the nonwoven fabric layers are laminated, these nonwoven fabric layers are preferably integrated into a laminated nonwoven fabric only by heat without using any binder.

In the present embodiment, the nonwoven fabric layer and/or the laminated nonwoven fabric is preferably calendered. Thereby, the nonwoven fabric layer can have a structure of more uniform gaps between fibers. Specifically, after fibers are joined by standard thermal bonding, the joined fibers are calendered at a temperature higher than the thermal bonding temperature by 10° C. or more and at a linear pressure of 100 to 1000 N/cm. At a linear pressure of 100 N/cm or more in calendering, more sufficient adhesion is obtained to demonstrate more sufficient strength. At a linear pressure of 1000 N/cm or less in calendering, deformation of fibers is reduced to attain the effect of the present invention more effectively and surely.

A particularly preferable method is a method of sequentially producing nonwoven fabric layers by the melt blown method or by spunbonding, laminating these layers, and pressure bonding the layers by an embossing roll or a heat press roll. This method is preferable in preparation of a uniform nonwoven fabric at a lower basis weight thereof because this method can form a laminated nonwoven fabric of the same material with a continuous and integrated production line.

If the fibers forming the laminated nonwoven fabric have uneven distribution, the uneven distribution generates a barrier against the mobility of an electrolyte such as lithium ions passing through the laminated nonwoven fabric, when a battery separator is formed of such a laminated nonwoven fabric and used. Such a barrier against the mobility of an electrolyte, if generated, readily impairs the uniformity of the battery reaction to cause a micro short circuit during charge and discharge or reduce the performance of the battery. Accordingly, uniform distribution of the fibers forming the nonwoven fabric greatly contributes to the performance of the separator of the battery.

A coefficient of variation of texture can be used as an index indicating the uniformity of the distribution of the fibers in the nonwoven fabric. The coefficient of variation of texture is preferably in the range of less than 2.3. At a coefficient of variation of texture of less than 2.3, the laminated nonwoven fabric used as a separator can suppress not only a reduction in the performance of the battery but also generation of short circuit during charge and discharge. To demonstrate high performance of the battery, a more preferable range of the coefficient of variation of texture is less than 2.0, and a still more preferable range is less than 1.7.

Here, the coefficient of variation of texture is measured by the following method.

The coefficient of variation of texture is measured with a formation tester (FMT-MIII). A test sample of 20 cm×30 cm is prepared, and is irradiated with a tungsten light bulb at DC low voltage (6 V, 30 W) from under the test sample disposed on a diffusion plate. An area measuring 18 cm×25 cm of the test sample is photographed with a CCD camera disposed on the side opposite to the side where the tungsten light bulb is disposed. The obtained transmission image is resolved into 128×128 pixels. Light intensity received by each pixel is measured, and the transmittance is calculated. The coefficient of variation of texture is defined as a value obtained by dividing the standard deviation (σ) of the transmittance of each micro site (5 mm×5 mm) in the sample measured by the average transmittance (E) (a value represented by Expression (2)). The value most straightforwardly indicates a variation in the basis weight of the micro region, and a smaller value indicates higher uniformity of distribution of the fibers.

$$\text{coefficient of variation of texture} = \sigma/E \times 100 \qquad (2)$$

If a sample is so small in size that a test sample cannot be prepared by the method above, the sample is cut into any size, and the pieces are bonded onto a cut nonwoven fabric having the same size as above and the same light transmittance as above to prepare a test sample. A transmission image of an area measuring 18 cm×25 cm of the entire test sample is subjected to measurement. Then, only the light transmittance of the bonded sample can be extracted to determine the coefficient of variation of texture.

The preparation method can facilitate integration of the nonwoven fabric layers more significantly because a proper temperature and pressure are applied to the nonwoven fabric layers by an embossing roll or a flat roll. In addition, relatively thin fibers prepared by the melt blown method can be penetrated into a nonwoven fabric layer composed of relatively thick thermoplastic resin fibers (preferably nonwoven fabric layer composed of thermoplastic synthetic long fibers). Thus, the fibers prepared by the melt blown method can be penetrated into the nonwoven fabric layer formed of thermoplastic resin fibers (preferably nonwoven fabric layer composed of thermoplastic synthetic long fiber) and be fixed thereto. Thereby, the strength of the structure of the laminated nonwoven fabric itself is enhanced, and the nonwoven fabric layer (I) is barely moved by an external force. For this reason, gaps in the nonwoven fabric layer formed of thermoplastic resin fibers (II) (preferably nonwoven fabric layer composed of thermoplastic synthetic long fiber) can be embedded by the nonwoven fabric layer (I) to construct a uniform network. As a result, a laminated nonwoven fabric having a proper distance between fibers described above and proper pore size distribution can be readily prepared. Namely, according to the method, in the laminated nonwoven fabric, part of the nonwoven fabric layer (I) can penetrate into the nonwoven fabric layer (II) while the nonwoven fabric layer (I) can keep a continuous layer, resulting in more uniform in-planar diffusibility and retention of the electrolytic solution in the laminated nonwoven fabric. Accordingly, a separator having higher performance can be prepared.

FIG. 1 is a conceptual diagram showing an example of a laminated nonwoven fabric having a three-layer structure. A laminated nonwoven fabric 3 has a structure in which a nonwoven fabric layer (I) 1 comprising the microfibers is interposed between two nonwoven fabric layers (II) 2.

In the specification, a variety of physical properties of the substrate and separator are measured by the following methods.

(1) Basis Weight (g/m²)

According to the method specified in JIS L-1913, test samples measuring 20 cm in length (length direction)×25 cm in width (transverse direction) are prepared in 1 m×1 m regions of a substrate and a separator. In each of the 1 m×1 m regions of the substrate and the separator, 9 samples in total are prepared (3 test samples per meter in the transverse direction by 3 test samples per meter in the length direction). The masses of the 9 test samples are measured, and the average value is converted into a mass per unit area to determine the basis weight.

(2) Thickness (mm)

According to the method specified in JIS L-1906, the thickness of the substrate or the separator is measured at 10 places per meter in width to determine the average value. The measurement is carried out at a load of 9.8 kPa.

(3) Porosity of Substrate

From the basis weight of the substrate measured in (1) and the thickness measured in (2), the porosity (%) is calculated from the following expression:

porosity=[1−(basis weight/thickness/density of the material for the substrate)]×100

(4) Measurement of Mean Flow Pore Size of Substrate

A Perm-Porometer available from PMI (trade name, type: CFP-1200AEX) is used. A Silwick (trade name) available from PMI is used as an immersion liquid in the measurement. A sample is immersed in the immersion liquid to sufficiently degass the sample, and is measured. The measurement apparatus uses a filter as a sample. The filter is immersed in a liquid having a known surface tension to cover all the pores of the filter with a film of the liquid. In this state, pressure is applied to the filter to measure the pore size of the pore calculated from the pressure to break the film of the liquid and the surface tension of the liquid. The calculation uses the following expression:

$$d=C \cdot r/P$$

(wherein d (unit: μm) is the pore size of the filter, r (unit: N/m) is the surface tension of the liquid, P (unit: Pa) is the pressure at which the film of the liquid having the pore size breaks, and C is a constant).

From the expression above, a flow rate (flow rate of a fluid) is measured when pressure P to be applied to the filter immersed in the liquid is changed continuously from a low pressure to a high pressure. At the initial pressure, the flow rate is 0 because the film of the liquid in the largest pore does not break. As the pressure increases, the film of the liquid in the largest pore breaks, and a flow rate occurs (bubble point). As the pressure further increases, the flow rate increases. When the film of the liquid in the smallest pore breaks, the flow rate at the pressure corresponds to the flow rate in the dry state (dry flow rate).

In the measurement method with the measurement apparatus, a value obtained by dividing a flow rate of a fluid at a pressure by a dry flow rate at the same pressure is called a cumulative filter flow rate (unit: %). The pore size in the film of the liquid at a pressure corresponding to a cumulative filter flow rate of 50% is called a mean flow pore size. In the specification, the substrate is used as the filter, and 3 points of each sample are measured by the measurement method above. The mean flow pore size is calculated as the average value.

In the present embodiment, the nonwoven fabric is hydrophilized as a preferable embodiment. A hydrophilized nonwoven fabric is readily impregnated with an electrolytic solution, preparing an electrochemical element having higher performance. Examples of the hydrophilization include physical hydrophilization such as hydrophilization by corona treatment or plasma treatment, and chemical hydrophilization such as introduction of a surface functional group (for example, introduction of a sulfonate group, a carboxylate group, or the like by oxidation treatment) and hydrophilization with a treatment agent such as a water-soluble polymer (such as PVA, polystyrene sulfonic acid, and polyglutamic acid) and a surfactant (such as nonionic, anionic, cationic, and amphoteric surfactants). The hydrophilized nonwoven fabric may readily contain the moisture content in the future to degrade the properties of the electrochemical element. Accordingly, the treatment amount, i.e., the mass of the treatment agent used in the treatment and the mass of the functional group to be introduced are preferably 3% by mass or less based on the mass of the nonwoven fabric. In the present embodiment, a corona treatment or a plasma treatment performed on the substrate preliminarily or immediately before application of the slurry is useful in enhancement of the adhesive force between the substrate and the inorganic particles and the binder. The degree of the treatment can be measured by determining a wetting tension with a wettability reagent. The value of the wetting tension is preferably 36 mN/m or more, more preferably 40 mN/m or more.

The present embodiment comprises a step of applying a slurry to a substrate or impregnating a substrate with a slurry to prepare a substrate with the slurry. The slurry can be applied to the substrate or the substrate can be impregnated with the slurry, by any method that can attain the coating basis weight, the amount of the inorganic particles, the thickness, and the area to be applied as needed. Examples of application methods include a gravure coater method, a small diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, a spray coating method, and a curtain coater method. Optionally, the slurry may be applied only to one surface of the substrate or may be applied to both surfaces thereof.

Preferably, a surface treatment performed on the surface of the substrate such as a nonwoven fabric before application of the slurry facilitates more uniform application of the slurry to enhance the adhesiveness between the inorganic particles and the substrate. Examples of methods for the surface treatment include any method not to remarkably impair the structure of the substrate (such as a porous structure), such as a corona discharge treatment method, a mechanical surface roughening method, a solvent treatment method, an acid treatment method, and an ultraviolet light oxidation method, but not limited to these.

The present embodiment comprises a step of drying the substrate with the slurry. Preferably, the drying is performed at a temperature equal to or less than the melting points of the inorganic particles and the material forming the substrate while the substrate is being fixed.

The content of the inorganic particles in the separator is preferably 10% by mass or more and less than 100% by mass, more preferably 15% by mass or more and 99% by mass or less, still more preferably 20% by mass or more and 90% by mass or less from the viewpoint of suppression of short circuit and maintenance of properties of the electrochemical element such as the rate characteristics.

Figure 4:
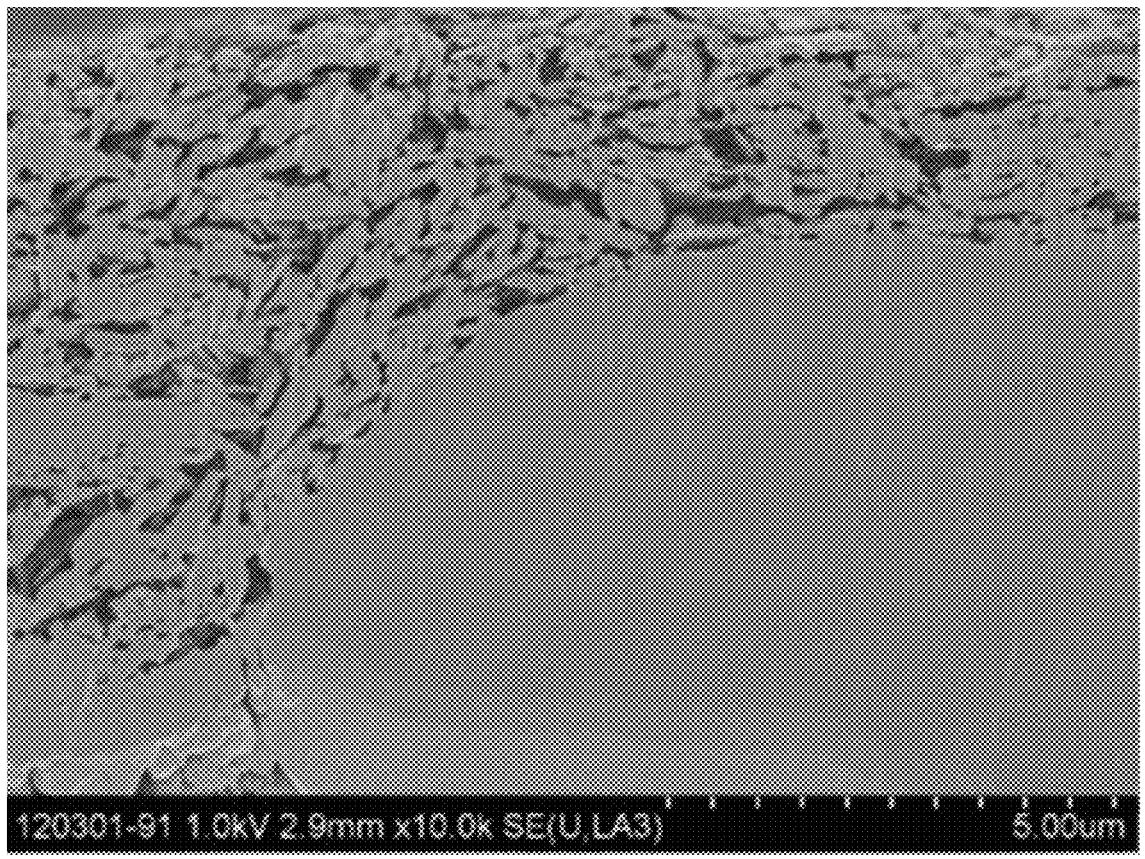
FIG. 4 is an electron microscopic photograph showing a cross section of a separator.
Figure 5:
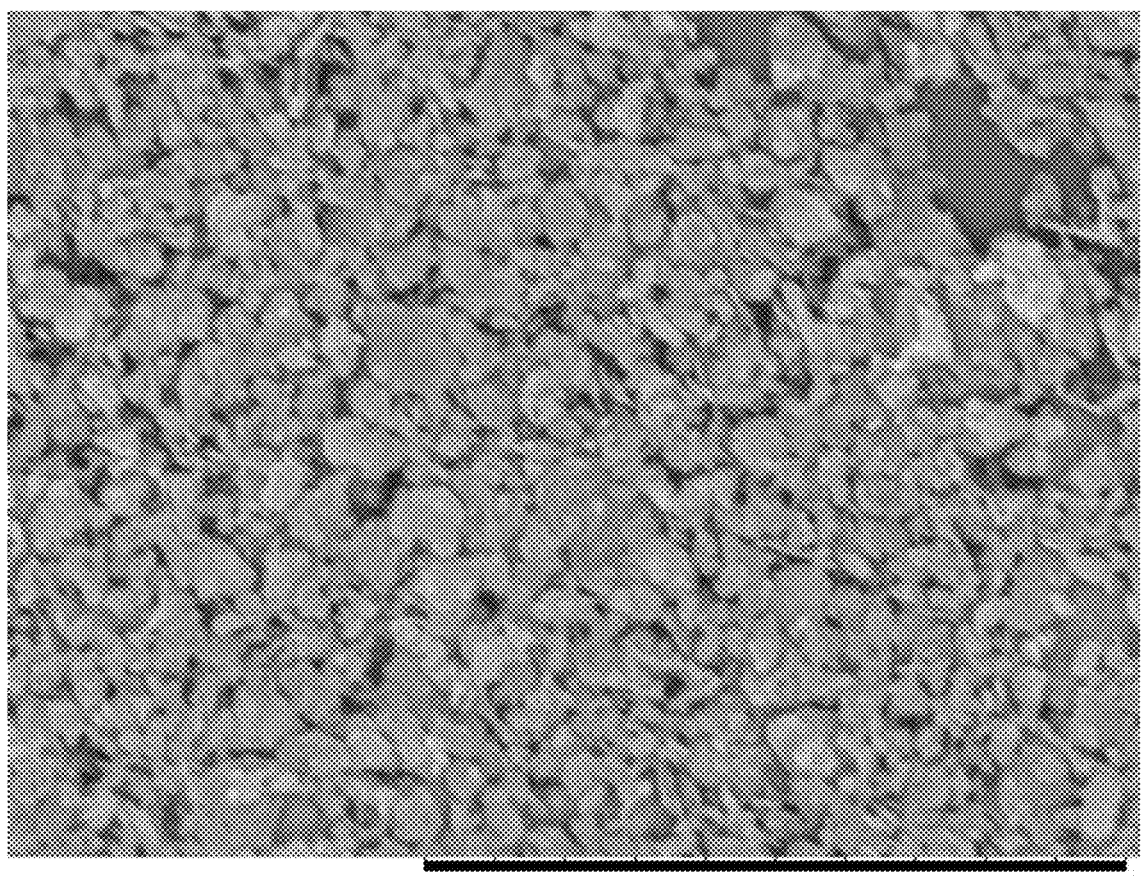
FIG. 5 is an electron microscopic photograph showing an outer surface of a separator.
Figure 6:
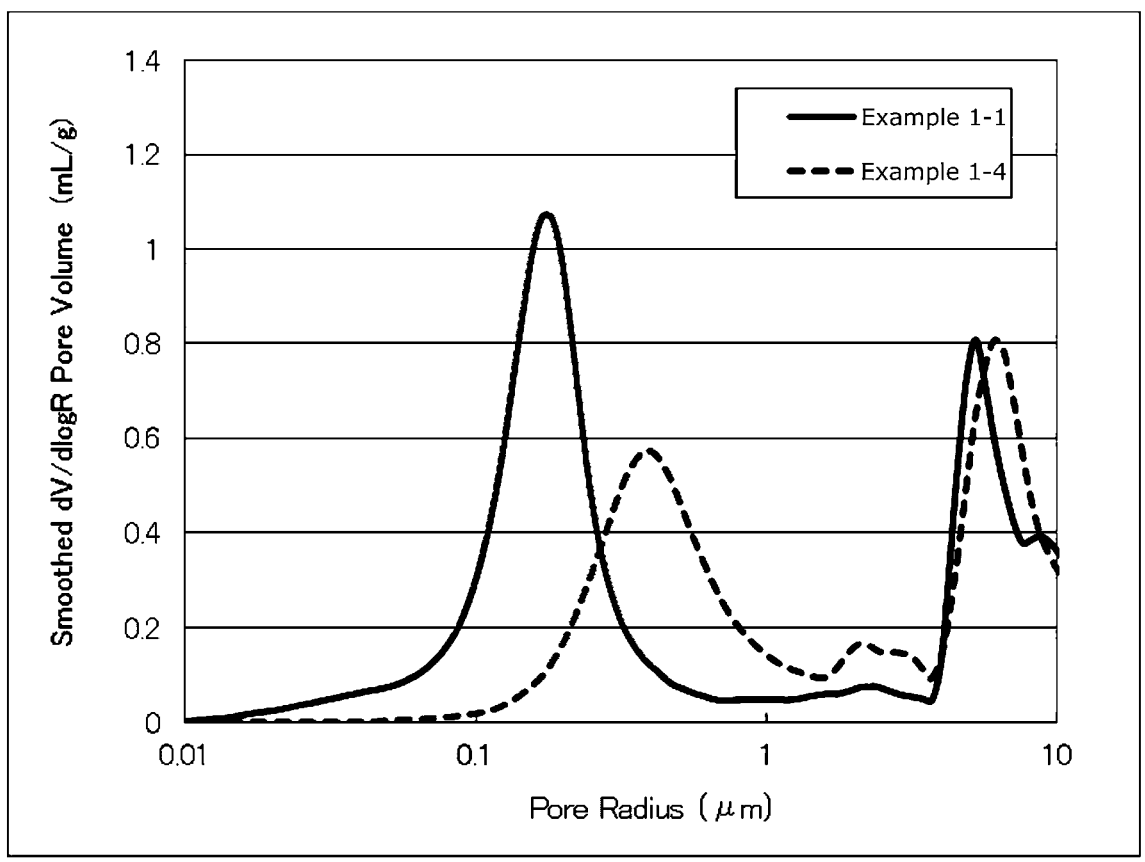
FIG. 6 is a diagram showing the pore size distribution of a separator.

The separator according to the present embodiment has a porosity of 45 to 70%, and its pore size distribution has one or more local maximum values in the range of the pore size of 0.1 to 1 μm and one or more local maximum values in the range of the pore size of 1 to 10 μm. An electron microscopic photograph showing an example of the cross section of such a separator is shown in FIG. 4, and an electron microscopic photograph of an example of the outer surface thereof is shown in FIG. 5. A typical pore size distribution is shown in FIG. 6 (FIGS. 4 to 6 will be described in detail later). The separator having a porosity of 45 to 70%, preferably 50 to 65% can attain high ion permeability. The pore size distribution having a local maximum value in the range of the pore size of 1 to 10 μm, more preferably 2 to 9 μm also can attain high ion permeability. The pore size distribution having a local maximum value in the range of the pore size of 0.1 to 1 μm, more preferably 0.1 to 0.7 μm can prevent short circuit. The pore size distribution can be measured with a mercury porosimeter. Specifically, initially, a low pressure range is measured at 0 to 345 kPa, and then a high pressure range is measured from atmospheric pressure to 228 MPa with a micrometrics auto porosimeter (Micrometrics AutoPorelV/9500 (trade name)) available from SHIMADZU Corporation. Calculation is performed where a contact angle between mercury and a sample is 130° and a surface tension of mercury is 484 dyn/cm. The sample is dried at 80° C. for one day before the measurement. The dried sample is folded into a 5 cm square, is disposed on a predetermined place in the porosimeter, and is measured.

The separator according to the present embodiment satisfying the pore size distribution and the porosity is prepared by using the laminated nonwoven fabric as the substrate, and applying the slurry containing the inorganic particles having a specific particle size to the substrate or impregnating the substrate with such a slurry. Plate-like inorganic particles are more preferably used from the viewpoint of the specific pore size distribution and the specific porosity.

(Electrochemical Element)

Subsequently, the electrochemical element according to the present embodiment will be described. Any electrochemical element according to the present embodiment including the separator can be used. When such an electrochemical element is a lithium ion secondary battery, for example, generation of short circuit caused by deposition of lithium dendrites can be suppressed, and the discharge capacity at a high rate can be maintained.

Any electrochemical element according to the present embodiment can be used, and are preferably used in applications required for safety at high temperatures such as lithium batteries using an organic electrolytic solution (primary batteries and secondary batteries) and supercapacitors. Namely, the electrochemical element according to the present embodiment may include the separator for an electrochemical element, and can have any configuration and any structure other than this requirement. Accordingly, the electrochemical element according to the present embodiment includes the separator, and besides, can have a variety of configurations and structures of a variety of known electrochemical elements containing organic electrolytic solutions (such as lithium secondary batteries, lithium primary batteries, and supercapacitors).

As one example of the electrochemical element according to the present embodiment, a lithium ion secondary battery including a positive electrode, a negative electrode, and a separator for an electrochemical element disposed between the positive electrode and the negative electrode, and an electrolytic solution will now be described in detail. Examples of the forms of the lithium ion secondary battery include outer cans such as steel cans and aluminum cans in tube-like forms (such as prismatic and cylindrical forms). The lithium ion secondary battery may be a soft package battery having an outer case composed of a laminated film of deposited metals.

For the positive electrode, any positive electrode used in known lithium ion secondary battery, namely, any known positive electrode containing an active material that can dope and dedope Li ions can be used without limitation. For example, for the positive electrode active material, lithium containing transition metal oxides represented by $Li_{1+x}MO_2$ (where $-0.1<x<0.1$, M: one or more elements selected from the group consisting of Co, Ni, Mn, Mg, Al, Zr, and Ti); lithium manganese oxides such as $LiMn_2O_4$; $LiMn_xM_{(1-x)}O_2$ where part of Mn of $LiMn_2O_4$ is substituted by another element; olivine $LiMPO_4$ (M: one or more elements selected from the group consisting of Co, Ni, Mn, and Fe); $LiMn_{0.5}Ni_{0.5}O_2$; and $Li_{(1+a)}Mn_xCo_yNi_{(1-x-y)}O_2$ (where $-0.1<a<0.1$, $0<x<0.5$, $0<y<0.5$) can be used. Examples of the positive electrode that can be used include positive electrodes comprising a positive electrode mixture and a current collector in which the positive electrode mixture prepared by properly adding a known conductive assistant (e.g., a carbon material such as carbon black) and a binder such as polyvinylidene fluoride (PVDF) to these positive electrode active materials is applied onto the current collector as a core material to form a molded body (positive electrode mixture layer).

For the current collector for the positive electrode, metal foils, punched metals, nets, and expanded metals of aluminum or the like are used. Typically, an aluminum foil having a thickness of 10 to 30 μm is suitably used.

A lead portion for the positive electrode is disposed typically as follows: in preparation of the positive electrode, the positive electrode mixture layer is not disposed in part of the current collector to leave an exposed portion of the current collector, and the exposed portion is used as a lead portion. It is not always required that the lead portion be integrated with the current collector from the beginning, and an aluminum foil or the like may be attached to the current collector to dispose the lead portion.

For the negative electrode, any negative electrode used in known lithium ion secondary battery, namely, any negative electrode containing an active material that can dope and dedope Li ions can be used without limitation. For example, for the negative electrode active material, carbon-based materials that can dope and dedope lithium, such as graphite, pyrolytic carbons, cokes, glass carbons, calcined products of organic high-molecular compounds, mesocarbon microbeads (MCMB), and carbon fibers, are used alone or as a mixture thereof. In addition, elements such as Si, Sn, Ge, Bi, Sb, and In and alloys thereof, compounds that can charge and discharge at low voltage close to that of lithium metal, such as lithium containing nitrides, or lithium metal and lithium/aluminum alloys can be used as the negative electrode active material. Examples of the negative electrode that can be used include negative electrodes comprising a negative electrode mixture and a current collector in which the negative electrode mixture prepared by properly adding a conductive assistant (e.g., carbon material such as carbon black) and a binder such as PVDF to these negative electrode active material is applied onto the current collector as a core material to form a molded body (negative electrode mixture layer); a variety of alloys or a lithium metal foil used alone; and negative electrodes including a negative electrode agent layer formed by laminating the alloy or a lithium metal layer on a current collector.

When a current collector is used in the negative electrode, the current collector can be foils, punched metals, nets, and expanded metals of copper or nickel. Typically, a copper foil is used. When the entire thickness of the negative electrode is reduced to attain a battery having a high energy density, the upper limit of the thickness of the negative electrode current collector is preferably 30 μm and the lower limit thereof is desirably 5 μm.

Similarly to the lead portion for the positive electrode, a lead portion for the negative electrode is disposed typically as follows: in preparation of the negative electrode, a negative electrode agent layer (including a layer containing a negative electrode active material, a negative electrode mixture layer) is not disposed in part of the current collector to leave an exposed portion of the current collector, and the exposed portion is used as a lead portion. It is not always required that the lead portion for the negative electrode be integrated with the current collector from the beginning, and a copper foil or the like may be attached to the current collector to dispose the lead portion.

The positive electrode and the negative electrode can be used in a form of a group of electrodes having a laminated structure in which positive electrode and the negative electrode are laminated with the separator according to the present embodiment being interposed therebetween, or in a form of the group of electrodes rolled into a rolled laminated structure.

The electrolytic solution (organic electrolytic solution) is a solution prepared by dissolving a lithium salt in an organic solvent. Any lithium salt can be used without limitation if the lithium salt does not dissociate in a solvent to form $Li^+$ ion, and does not make a side reaction such as decomposition in the range of voltage used for the battery. Examples of the lithium salt that can be used include inorganic lithium salts such as $LiClO_4$, $LiPF_6$, $LiBF_4$, $LiAsF_6$, $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 5$), and $LiN(RfOSO_2)_2$ (where Rf is a fluoroalkyl group).

The electrolytic solution can contain any organic solvent that can dissolve the lithium salts, and does not make a side reaction such as decomposition in the range of voltage used for the battery. Examples of the organic solvent include cyclic carbonates such as ethylene carbonate, propylene carbonate, butylene carbonate, and vinylene carbonate; linear carbonates such as dimethyl carbonate, diethyl carbonate, and methyl ethyl carbonate; linear esters such as methyl propionate; cyclic esters such as γ-butyrolactone; linear ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxypropionitrile; and sulfurous acid esters such as ethylene glycol sulfite. These are used alone or in combination. To attain a battery having higher properties, a combination of these organic solvents that can attain high permittivity is desirable, for example, a mixed solvent of ethylene carbonate and a linear carbonate. To enhance properties such as safety, charge and discharge cycle characteristics, and storage properties at high temperatures, additives such as vinylene carbonates, fluoroethylene carbonates, 1,3-propanesultone, diphenyl disulfide, cyclohexyl benzene, biphenyl, fluorobenzene, and t-butylbenzene can be properly added to these electrolytic solutions. To suppress the decomposition of the material for the nonwoven fabric, carbonate esters having C=C bonding, fluorine-containing cyclic carbonates, and sulfones described later can also be properly added.

The concentration of the lithium salt in the electrolytic solution is preferably 0.5 to 1.5 mol/L, more preferably 0.9 to 1.25 mol/L.

The organic solvent can be replaced with an ambient-temperature molten salt such as ethyl-methylimidazolium trifluoromethylsulfoniumimide, heptyl-trimethylammonium trifluoromethylsulfoniumimide, pyridinium trifluoromethylsulfoniumimide, and guanidinium trifluoromethylsulfoniumimide.

Furthermore, a polymer material containing the electrolytic solution to gel the solution may be added to gel the electrolytic solution, and the gelled electrolytic solution may be used in the battery. Examples of the polymer material for gelling the electrolytic solution include known host polymers that can form a gel-like electrolyte, such as PVDF, vinylidenefluoride-hexafluoropropylene copolymer (PVDF-HFP), PAN, polyethylene oxide, polypropylene oxide, ethylene oxide-propylene oxide copolymers, crosslinked polymers having an ethylene oxide chain in the main chain or the side chain, and crosslinked poly(meth)acrylate ester.

The present embodiment can provide a separator for an electrochemical element that can maintain high rate characteristics and suppress short circuit, the method of preparing the separator, and a lithium ion secondary battery including the separator for an electrochemical element.

Next, Second Embodiment will be described. The separator according to the present embodiment includes a nonwoven fabric membrane comprising sheath-core composite fibers in which a sheath portion comprises a polyolefin-based resin and a core portion comprises a polyester-based resin. The separator according to the present embodiment is suitably used as a separator for an electrochemical element included in an electrochemical element. In particular, the electrochemical element is preferably a lithium ion secondary battery. The lithium ion secondary battery according to the present embodiment includes the separator having a specific structure, an electrolytic solution containing a non-aqueous solvent and a lithium salt, a positive electrode containing one or more positive electrode active materials selected from the group consisting of materials that can dope and dedope lithium ions, and a negative electrode containing one or more negative electrode active materials selected from the group consisting of materials that can dope and dedope lithium ions, and metal lithium.

<Separator>

The lithium ion secondary battery according to the present embodiment includes a separator between the positive electrode and the negative electrode to give safety such as prevention of short circuit in the positive and negative electrodes and shutdown. The separator includes a nonwoven fabric membrane comprising sheath-core composite fibers in which a sheath portion comprises a polyolefin-based resin and a core portion comprises a polyester-based resin. The separator is preferably an insulating thin film having high ion permeability and high mechanical strength. Here, the sheath-core composite fiber indicates a fiber having a core portion extending the length direction of the fiber and a sheath portion that covers the core portion.

The nonwoven fabric membrane can be any membrane including a nonwoven fabric layer comprising sheath-core composite fibers. The fiber diameter of the composite fibers is preferably 30 μm or less, more preferably 0.1 to 30 μm. The nonwoven fabric layer comprising the composite fibers may contain fibers other than the composite fibers in the range so as not to impair the effects of the present invention. The nonwoven fabric layer comprises preferably 50% by mass or more, more preferably 80% by mass or more, still more preferably 90% by mass or more of the composite fibers, and is particularly preferably composed of the composite fibers. In the nonwoven fabric membrane, a nonwoven fabric layer comprising the composite fibers may be used as a single layer, or two or more of the nonwoven fabric layers may be laminated directly or indirectly. The nonwoven fabric membrane may include the nonwoven fabric layer comprising the composite fibers and one or two or more additional fiber layers laminated thereon. The additional fiber layer may be the nonwoven fabric layers. Alternatively, to suppress short circuit more significantly and attain higher output, diffusion of lithium ions should be prevented as much as possible. From this viewpoint, the additional fiber layer is desirably a first nonwoven fabric layer comprising fibers having a fiber diameter of 4 μm or less, preferably 0.1 to 4 μm (hereinafter also referred to as a "nonwoven fabric layer (I)").

In the nonwoven fabric layer (I), at a fiber diameter of the fibers of 4 μm or less, uneven or excessively large gaps between the fibers contained in the nonwoven fabric layer can be reduced, enabling formation of a denser and more uniform nonwoven fabric layer. At a fiber diameter of the fibers of 0.1 μm or more, the fibers can be readily formed, and the formed fibers can be prevented from generating scuffing or lint by surface friction or the like. The fibers having a fiber diameter of 4 μm or less are also referred to as "microfibers." The uniformity of the nonwoven fabric layer, the nonwoven fabric membrane and the separator means that the gaps between the fibers forming these members are uniform, and in addition to this, the distributions of the thickness, the fiber diameter, the basis weight, and the gaps are uniform.

In the present embodiment, the material for the nonwoven fabric layer (I) may be a thermoplastic resin, or may be a material used as a non-thermoplastic resin material for known nonwoven fabrics, such as cellulose fibril. A suitable material is a thermoplastic resin as in the nonwoven fabric layer (II) described later. Examples of such a thermoplastic resin specifically include polyester-based resins and derivatives thereof; polyolefin-based resins and derivatives thereof; polyamide-based resins and derivatives thereof; polyoxymethylene ether resins, polyphenylene sulfide (PPS) resins, polyphenylene oxide (PPO) resins, polyketone-based resins such as polyketone resin, polyether ether ketone (PEEK); and thermoplastic polyimide resins. Examples of the polyester-based resins include polyethylene terephthalate (PET)-based resins, polybutylene terephthalate (PBT)-based resins, and polyethylene naphthalate (PEN)-based resins. Examples of the polyolefin-based resins include polyethylene resins, polypropylene resins, and polyolefin-based resins such as polyethylene/polypropylene copolymers.

These materials are used alone or in combination. In the present embodiment, the term "-based resin" indicates a concept that all of the repeating units forming have a basic skeleton structure. For example, a term "PET-based resin" indicates a concept that besides a PET resin, all of the repeating units have a PET basic skeleton, i.e., a condensation structure of terephthalic acid and ethylene glycol.

The nonwoven fabric layer (I) may contain fibers other than the microfibers in the range so as not to impair the effect. The nonwoven fabric layer (I) contains preferably 50% or more, more preferably 80% or more, still more preferably 90% or more of the microfibers in terms of mass, and is particularly preferably composed of the microfibers only. The fiber diameter of the microfibers contained in the nonwoven fabric layer (I) is preferably 0.3 to 4 μm, more preferably 0.3 to 3.5 μm, still more preferably 0.5 to 3 μm, particularly preferably 0.1 to 1 μm. In particular, fibers having a fiber diameter of 0.1 to 1 μm can further increase the output of the lithium ion secondary battery including such fibers in the nonwoven fabric layer (I). The "fiber diameter" in this specification is measured with a microscope, and more specifically measured according to Examples below.

The nonwoven fabric layer according to the present embodiment can be prepared by any method. The method of preparing the nonwoven fabric layer (I) can be preferably a dry-type method or a wet-type method using microfibers, or electrospinning and a melt blown method. The method is more preferably a melt blown method because the nonwoven fabric layer (I) can be formed more readily and densely.

If only a nonwoven fabric layer formed by the spunbonding or a wet-type method described later is used in the separator, the lithium ion secondary battery readily causes short circuit because the fiber diameter of the fibers forming the nonwoven fabric layer is relatively large, i.e., usually about a dozen micrometers. In contrast, if a nonwoven fabric layer formed by the melt blown method is used in the separator, the lithium ion secondary battery barely causes short circuit because the fiber diameter of the fibers forming the nonwoven fabric layer is relatively small, i.e., usually about several micrometers.

The nonwoven fabric layer laminated on the nonwoven fabric layer (I) in an embodiment using a nonwoven fabric of a sheath-core structure preferably comprises fibers prepared by spunbonding from the viewpoint of enhancement of mechanical strength. To further prevent excessively thick fibers prepared by spunbonding and attain more uniform distances between the fibers, the fibers has a fiber diameter of preferably more than 4 μm and 30 μm or less, more preferably 6 to 25 μm, still more preferably 8 to 20 μm. Furthermore, the nonwoven fabric layer to be laminated on the nonwoven fabric layer (I) is preferably the nonwoven fabric layer comprising the composite fibers. The nonwoven fabric layer comprising the composite fibers is more preferably the second nonwoven fabric layer having a fiber diameter of more than 4.0 μm and 30.0 μm or less (hereinafter also simply referred to as a "nonwoven fabric layer (II)". The composite fibers are preferably the fibers prepared by spunbonding.

Figure 2:
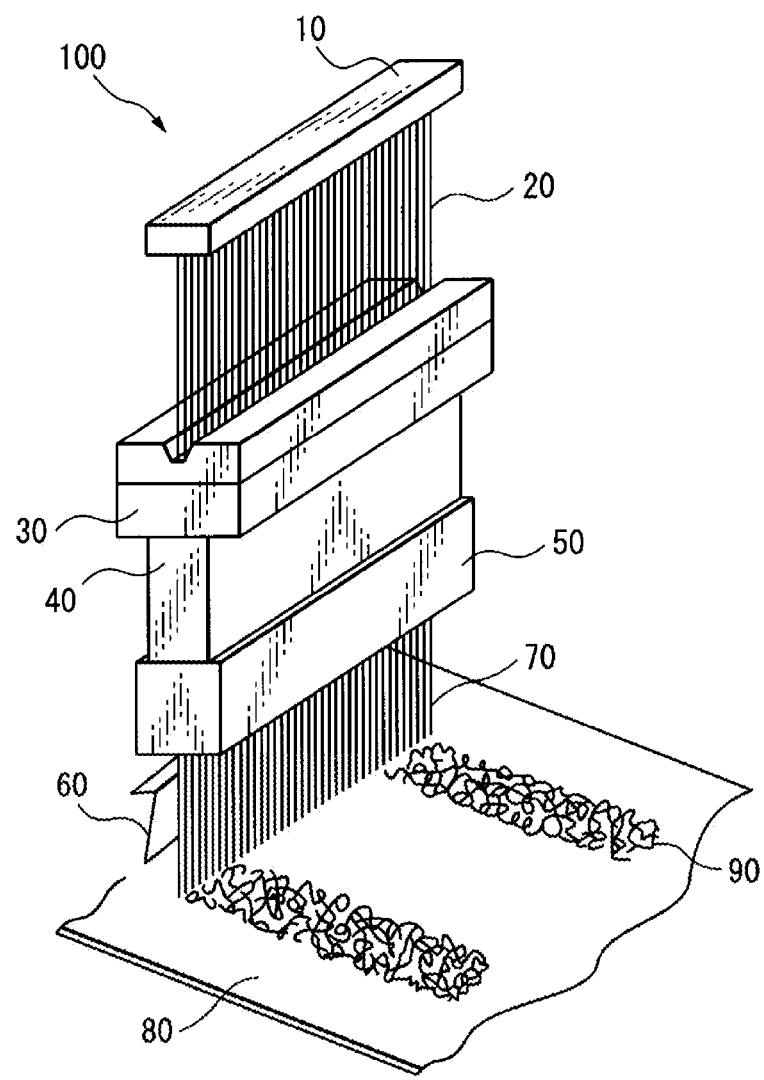
FIG. 2 is a schematic view showing an apparatus for preparing a nonwoven fabric comprising a fibers prepared by spunbonding.
Figure 3:
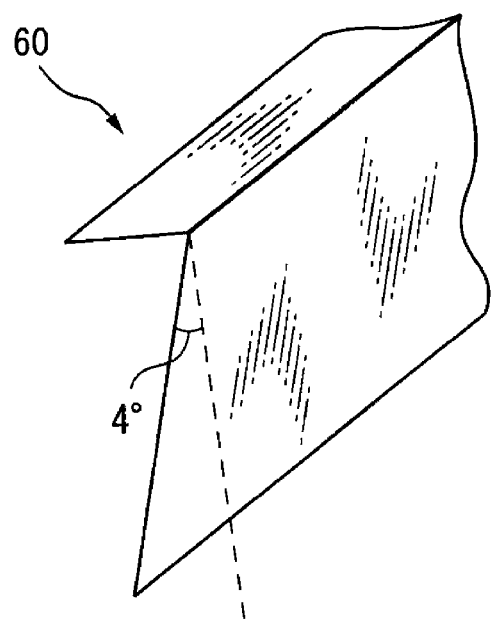
FIG. 3 is an enlarged view of a dispersion plate shown in FIG. 2.

FIG. 2 is a schematic view showing an apparatus 100 for preparing a nonwoven fabric comprising fibers prepared by spunbonding. The apparatus 100 includes a spinneret 10 having a width corresponding to the width of a nonwoven fabric to be prepared, an air aspirator 30 into which expelled filaments 20 extruded from the spinneret are introduced, a consecutively connected channels 40 disposed continuously (not spaced) from the air aspirators 30, a corona charging channel device 50, and a dispersion plate 60. In such a configuration, the expelled filaments 20 extruded from the spinneret 10 are fed through the air aspirators 30 and the consecutively connected channels 40 to the corona charging channel device 50, and are charged by corona discharge in the channel apparatus. Then, the filaments are accumulated on a collecting surface 80 to form a web 90. At this time, an air stream is controlled with the dispersion plate 60 to open and disperse these fibers by static electricity and the air stream and increase the uniformity of the web. FIG. 3 is an enlarged view of the dispersion plate 60 shown in FIG. 2. In Examples 1-16 to 1-30 below, a dispersion plate is disposed to be inclined at 4° to charged filaments 70 protruding vertically from the corona charging channel device 50.

In the composite fibers, the melting point of the resin forming the sheath portion is preferably lower than that of the resin forming the core portion because high strength is attained at a relatively low basis weight.

The content of the low melting point resin forming the sheath portion contained in the sheath-core composite fibers is preferably 10 to 90% by mass, more preferably 15 to 85% by mass, still more preferably 20 to 80% by mass based on the total mass of the composite fibers. If the content of the low melting point resin contained is within the range above, the resulting composite fibers have higher spinnability and more sufficient mechanical strength. As a result, the nonwoven fabric layer comprising the composite fibers attains higher mechanical strength.

The low melting point resin forming the sheath portion is preferably a thermoplastic resin, and examples thereof include polyethylene (hereinafter also referred to as "PE") resins, polypropylene (hereinafter also referred to as "PP") resins, and polyolefin-based resins such as polyethylene/polypropylene copolymers.

Examples of PP resins include polypropylene resins synthesized with a typical Ziegler-Natta catalyst, and polypropylene resins synthesized with a single site active catalyst such as metallocene. Examples of PE resins include high density polyethylene (HDPE) resins, linear low density polyethylene (LLDPE) resins, and low density polyethylene (LDPE) resins. A polyolefin-based resin comprising a polymer containing a PP resin, a small amount of a PE resin and other additives can also be used. In the specification, the "polyolefin-based resin" has a carbon-carbon binding structure derived from olefin in all of the repeating units forming the resin.

The content of a high melting point resin forming the core portion contained in the sheath-core composite fibers is preferably 10 to 90% by mass, more preferably 15 to 85% by mass, still more preferably 20 to 80% by mass based on the total amount of the composite fibers. If the content of the high melting point resin to be contained is within the range above, the resulting composite fibers have higher spinnability and more sufficient mechanical strength. As a result, the nonwoven fabric layer comprising the composite fibers attains higher mechanical strength.

The high melting point resin forming the core portion is preferably a thermoplastic resin, and more preferably a polyester-based resin. Examples of the polyester-based resins include polyethylene terephthalate (PET)-based resins, polybutylene terephthalate (PBT)-based resins, and polyethylene naphthalate (PEN)-based resins. PET-based resins are preferable, and PET resins are more preferable. Copolymers mainly composed of these resins (namely, copolymers comprising monomers of these resins as a monomer unit in the largest content, preferably in the content of 50% or more) or mixtures mainly containing these resins (namely, mixtures containing these resins in the largest amount in terms of mass, preferably 50% by mass or more) are also preferable.

In the nonwoven fabric membrane according to the present embodiment, the nonwoven fabric layer (I) is preferably present as a layer interposed between two or more nonwoven fabric layers (II) (hereinafter also referred to as an "intermediate layer") because higher mechanical strength is maintained by the nonwoven fabric layer (II) having a larger fiber diameter. In the specification, the "outermost layer" indicates a layer located at the farthest end of the laminate direction. In the nonwoven fabric membrane according to an embodiment using the nonwoven fabric having a sheath-core structure, an additional fiber layer, preferably a nonwoven fabric layer may be included in addition to the nonwoven fabric layer (I) and the nonwoven fabric layer (II) at an extent that achievement of the objects of the present invention are not inhibited.

When the nonwoven fabric membrane comprises the laminated nonwoven fabric formed of the nonwoven fabric layer (I) and the nonwoven fabric layer (II), the forms of the lamination are:

nonwoven fabric layer (I)/nonwoven fabric layer (II)

nonwoven fabric layer (I)/nonwoven fabric layer (II)/nonwoven fabric layer (I)

nonwoven fabric layer (I)/nonwoven fabric layer (II)/nonwoven fabric layer (I)/nonwoven fabric layer (II)/nonwoven fabric layer (I)

nonwoven fabric layer (I)/nonwoven fabric layer (II)/nonwoven fabric layer (II)/nonwoven fabric layer (I)

nonwoven fabric layer (II)/nonwoven fabric layer (I)/nonwoven fabric layer (II)

nonwoven fabric layer (II)/nonwoven fabric layer (I)/nonwoven fabric layer (II)/nonwoven fabric layer (I)/nonwoven fabric layer (II)

nonwoven fabric layer (II)/nonwoven fabric layer (I)/nonwoven fabric layer (I)/nonwoven fabric layer (II)

The separator according to the present embodiment has a thickness of preferably 10 to 60 μm, more preferably 10 to 50 μm, still more preferably 15 to 40 μm, particularly preferably 20 to 30 μm. The thickness of the separator is preferably 10 μm or more from the viewpoint of mechanical strength and suppression of short circuit by separating the positive negative electrodes from each other. The thickness of the separator is preferably 60 μm or less from the viewpoint of an increase in the output density as the battery and suppression of a reduction in energy density.

When the nonwoven fabric membrane according to the present embodiment is used in separator for lithium ion secondary battery, the porosity of the membrane is preferably controlled to some extent to ensure ion permeability sufficiently. The porosity of the nonwoven fabric membrane is preferably 45 to 90%, more preferably 50 to 80%. A porosity of 45% or more attains higher output properties while a porosity of 90% or less can suppress short circuit more significantly. For determination of the porosity of the nonwoven fabric membrane, the mass of the nonwoven fabric membrane and the apparent volume thereof are measured. From these measured values and the density of the material forming the nonwoven fabric membrane, the porosity can be calculated.

In the present embodiment, the basis weight of the nonwoven fabric layer (I) is preferably 15 g/m$^2$ or less. A basis weight of the nonwoven fabric layer (I) of 15 g/m$^2$ or less is advantageous in suppression of short circuit, and can attain higher output properties. The basis weight of the nonwoven fabric layer (I) is more preferably 0.5 to 13 g/m$^2$, more preferably 1 to 11 g/m$^2$. In the specification, the basis weight is measured according to the method described in Examples.

In the present embodiment, the total basis weight of the nonwoven fabric membrane is preferably 30 g/m$^2$ or less. The total basis weight of the nonwoven fabric membrane of 30 g/m$^2$ or less can attain higher output properties. From the viewpoint of mechanical strength, the total basis weight of the nonwoven fabric membrane is preferably 4 g/m$^2$ or more, more preferably 4 to 25 g/m$^2$, still more preferably 5 to 20 g/m$^2$.

In the present embodiment, the total basis weight of the separator is preferably 30 g/m$^2$ or less. A total basis weight of the separator of 30 g/m$^2$ or less can attain higher output properties. From the viewpoint of mechanical strength, the total basis weight of the separator is preferably 4 g/m$^2$ or more, more preferably 4 to 25 g/m$^2$, still more preferably 5 to 20 g/m$^2$.

The nonwoven fabric membrane according to the present embodiment preferably includes the nonwoven fabric layer (I). Thereby, the distances between fibers are reduced, namely, the pore size is reduced, so that a layer having more uniform gaps between the fibers is readily formed. From such a viewpoint, the average pore size of the nonwoven fabric membrane according to the present embodiment is preferably 0.3 to 30 μm. The average pore size is more preferably 1 to 20 μm.

In the present embodiment, when the nonwoven fabric membrane includes a laminated nonwoven fabric of two or more nonwoven fabric layers, e.g., two or more nonwoven fabric layers (II), or a nonwoven fabric layer (II) and an additional nonwoven fabric layer (e.g., the nonwoven fabric layer (I)), such a laminated nonwoven fabric can be formed by any method without limitation. Preferably, a method of integrating these layers with each other by chemical bond and/or physical bond is used. Examples of integration by chemical bond include methods by chemical crosslinking. Examples of integration by physical bond include a method by thermal bonding layers, a method for making three dimensional entanglement by jetting fast-water stream, and a method of integrating layers with a particulate or fibrous adhesive. Among these, examples of the method of integrating layers by thermal bonding include integration by thermal embossing (thermal embossing roll method) and integration with hot air having a high temperature (air through method). The integration by thermal bonding is preferable because it can keep tensile strength and bending flexibility of nonwoven fabric and heat-resistance stability more effectively.

The integration by thermal bonding is also preferable because a laminated nonwoven fabric including a plurality of nonwoven fabric layers can be prepared without a binder. If a binder is used to integrate the nonwoven fabric layers into a laminated nonwoven fabric, the binder remains in the separator. The residual binder is not problematic if the binder does not reduce the performance of the battery. For some binders which reduce the performance of the battery, an additional step of removing the binder is needed. For these reasons, when the nonwoven fabric layers are laminated, the nonwoven fabric layers are preferably integrated into a laminated nonwoven fabric only by heat without using any binder.

In the present embodiment, the nonwoven fabric layer is preferably calendered. Thereby, the nonwoven fabric layer can have a structure of more uniform gaps between fibers. Moreover, the thickness and the porosity of the separator can be readily controlled. Specifically, after fibers are joined by standard thermal bonding, the joined fibers are calendered at a temperature higher than the thermal bonding temperature by 10° C. or more and at a linear pressure of 100 to 1000 N/cm, for example. At a linear pressure of 100 N/cm or more in calendering, more sufficient adhesion is obtained to demonstrate more sufficient strength. At a linear pressure of 1000 N/cm or less in calendering, deformation of fibers is preferably reduced to sufficiently adhere the fibers and attain the effects according to the present invention more significantly and more effectively. The conditions on calendering are not limited to these.

In the present embodiment, the nonwoven fabric is hydrophilized as a preferable embodiment. A hydrophilized nonwoven fabric is readily impregnated with an electrolytic solution, preparing a battery having higher performance. Examples of the hydrophilization include physical hydrophilization such as hydrophilization by corona treatment or plasma treatment, and chemical hydrophilization such as introduction of a surface functional group (for example, introduction of a sulfonate group, a carboxylate group, or the like by oxidation treatment) and hydrophilization with a treatment agent such as a water-soluble polymer (such as PVA, polystyrene sulfonic acid, and polyglutamic acid) and a surfactant (such as nonionic, anionic, cationic, and amphoteric surfactants). The hydrophilized nonwoven fabric may readily contain the moisture content in the future to degrade the properties of the battery. Accordingly, the treatment amount, i.e., the mass of the treatment agent used in the treatment and the mass of the functional group to be introduced are preferably 3% by mass or less based on the mass of the nonwoven fabric.

The separator according to the present embodiment comprises the inorganic particles and the resin binder. Preferably, the inorganic particles and the resin binder are contained on the nonwoven fabric layer and inside the nonwoven fabric.

Any inorganic particles can be used without limitation. Preferably, these are non-conductive, and chemically and electrochemically stable to the battery forming material.

Any synthetic products and natural products can be used as such inorganic particles. Examples of the inorganic particles include ceramics and glass fibers of oxide ceramics such as alumina such as gibbsite, bayerite, boehmite, and corundum, silica, titania, zirconia, magnesia, ceria, yttria, zinc oxide, and iron oxide; nitride ceramics such as silicon nitride, titanium nitride, and boron nitride; silicon carbide, calcium carbonate, aluminum sulfate, aluminum hydroxide, magnesium hydroxide, potassium titanate, talc, synthetic kaolinite, kaolin clay, kaolinite, fraiponite, stevensite, dickite, nacrite, halloysite, pyrophyllite, odinite, montmorillonite, beidellite, nontronite, volkonskoite, saponite, hectorite, fluorine hectorite, sauconite, swinefordite, vermiculite, fluorine vermiculite, berthierine, sericite, amesite, kellyite, fraiponite, brindleyite, bentonite, zeolite, biotite, phlogopite, fluorine phlogopite, annite, eastonite, tainiolite, siderophyllite tetra-ferri-annite, lepidolite, tetrasilicic fluoromica, polylithionite, muscovite, celadonite, ferroceladonite, ferroaluminoceladonite, aluminoceladonite, tobelite, paragonite, clintonite, kinoshitalite, bityite, anandite, margarite, clinochlore, chamosite, pennantite, nimite, baileychlore, donbassite, cookeite, sudoite, hydrotalcite, calcium silicate, magnesium silicate, aluminum silicate, diatomite, and quartz sand.

These inorganic particles are used alone or in combination. From the viewpoint of electrochemical stability, inorganic oxides such as aluminum oxide, boehmite, calcined kaolin, titanium oxide, zinc oxide, and magnesium oxide are preferable as the inorganic particles. From the viewpoint of cost, calcined kaolin is more preferable.

Calcined kaolin is prepared by calcining kaolin mainly composed of kaolin mineral such as kaolinite or agalmatolite mainly composed of pyrophyllite. Since crystallization water is released and impurities are removed during calcination, calcined kaolin is preferable from the viewpoint of chemical stability in the battery, particularly electrochemical stability.

The inorganic particles have an average particle size of preferably 1 to 4 µm. The inorganic particles more preferably have 40% by volume or less of particles having a particle size of 1 µm or less and 30 to 75% by volume of particles having a particle size of 2 µm or more. The average particle size of the inorganic particles is preferably 1 µm or more to more effectively maintain ion permeability in the layer containing the inorganic particles to more effectively maintain the discharge capacity at a high rate. The average particle size is preferably 4 µm or less to more effectively maintain the density of the layer containing the inorganic particles and more significantly suppress generation of short circuit. The average particle size is more preferably 1.2 to 4 µm, still more preferably 1.5 to 4 µm. At an average particle size within this range, a reduction in the discharge capacity at a high rate is suppressed more significantly. The average particle size of the inorganic particles is measured according to the method described in Examples later.

When the inorganic particles are contained in the separator, the resin binder is used to bind the inorganic particles to each other and fix the inorganic particles to the nonwoven fabric layer in the separator. Any resin binder can be used without limitation. Preferably, a resin binder insoluble in an electrolytic solution and electrochemically stable is used.

Specific examples of such resin binders include polyolefin-based resins such as polyethylene and polypropylene, polybutene, and copolymers thereof and modified polyolefin-based resins such as chlorinated or acid-modified polyolefin-based resins; fluorine-containing resins such as polyvinylidene fluoride and polytetrafluoroethylene; fluorine-containing rubbers such as vinylidene fluoride-hexafluoropropylene-tetrafluoroethylene copolymers and ethylene-tetrafluoroethylene copolymers; rubbers such as (meth)acrylic acid-styrene-butadiene copolymers and hydrides thereof, acrylonitrile-butadiene copolymers and hydrides thereof, acrylonitrile-butadiene-styrene copolymers and hydrides thereof, methacrylic acid ester-acrylic acid ester copolymers, styrene-acrylic acid ester copolymers, acrylonitrile-acrylic acid ester copolymers, ethylene propylene rubber, polyvinyl alcohol, and polyvinyl acetate; cellulose derivative such as ethyl cellulose, methyl cellulose, hydroxy ethyl cellulose, and carboxymethyl cellulose; and resins having a melting point and/or a glass transition temperature of 180° C. or more such as polyphenylene ether, polysulfone, polyethersulfone, polyphenylene sulfide, polyether imide, polyamidimide, polyamide, and polyester. These resin binders are used alone or in combination. Among these, the resin binder is preferably (meth)acrylic acid copolymers, polyolefin-based resins such as polyethylene, polypropylene, and polybutene and copolymers thereof, and modified polyolefin resins such as chlorinated and acid-modified polyolefin resins, more preferably (meth) acrylic acid copolymers having self-crosslinking properties.

The inorganic particles and the resin binder can be contained in the separator by any method. Examples of the method include a method of dissolving or dispersing inorganic particles and a resin binder in a solvent to prepare a slurry, applying the slurry to a nonwoven fabric layer or a laminated nonwoven fabric (hereinafter also simply referred to as a "nonwoven fabric layer or the like"), and removing the solvent. The solvent for dissolving or dispersing the inorganic particles and the resin binder is preferably a solvent that can disperse the inorganic particles more homogeneously and stably. Examples thereof include N-methyl pyrrolidone, N,N-dimethylformamide, N,N-dimethylacetamide, water, ethanol, toluene, hot xylene, methylene chloride, and hexane. Among these, water is preferable from the viewpoint of environmental protection.

The content of the inorganic particles contained in the slurry is preferably 5 to 70% by mass, more preferably 10 to 60% by mass from the viewpoint of the viscosity and applicability of the slurry and a reduction in the step of drying the slurry.

The content of the resin binder contained in the slurry is preferably 1 part by mass or more, more preferably 4 parts by mass or more based on 100 parts by mass of the inorganic particles because the binding and fixing effects of the binder are more effectively demonstrated. The content of the resin binder is preferably 25 parts by mass or less, more preferably 15 parts by mass or less based on 100 parts by mass of the inorganic particles because a reduction in permeability of ions and a reduction in properties of the battery caused by gaps between the fibers of the nonwoven fabric layer or the like being covered with a resin binder are more effectively suppressed.

To stabilize the dispersion of the inorganic particles and enhance applicability, the slurry can contain a variety of additives such as dispersants such as surfactants; thickeners; wetting agents; antifoaming agents; and pH adjusters containing acids and alkalis. These additives are preferably removable during the removal of the solvent. The additives electrochemically stable in the range of use of the lithium ion secondary battery without inhibiting the battery reaction and stable up to approximately 200° C. may remain in the separator. These additives may be the same as those described in First Embodiment.

The inorganic particles and the resin binder can be dissolved or dispersed in a solvent for a slurry by any method that can attain the dissolving or dispersing properties of the slurry needed for application of the slurry onto the nonwoven fabric layer or the like. Examples of the dissolving or dispersing method include mechanical stirring with ball mills, bead mills, planetary ball mills, vibration ball mills, sand mills, colloid mills, Attritors, roll mills, high-speed impeller dispersing machines, dispersers, homogenizers, ultrasonic homogenizers, pressure homogenizer, extra-high pressure homogenizers, high-speed homogenizers, high-speed impact mills, thin film rotary high-speed mixers, high-speed impact mills, ultrasonic dispersers, and stirring blades.

To contain the inorganic particles and the resin binder in the separator, the slurry is applied to the nonwoven fabric layer or the like, and the solvent is removed. The slurry can be applied to the nonwoven fabric and the like by any method that can attain the amount of the inorganic particles and the coating area thereof needed. Examples of the coating methods include a gravure coater method, a small diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a curtain coater method, a screen printing method, and a spray coating method. Optionally, the slurry may be applied only to one surface of the nonwoven fabric layer or the like, or may be applied to both surfaces thereof.

More preferably, a surface treatment positively performed on the surface of the nonwoven fabric layer or the like before application of the slurry facilitates more uniform application of the slurry to enhance the adhesiveness between the inorganic particles and resin binder and the surface of the nonwoven fabric after application. Examples of methods for the surface treatment include any method not to remarkably impair the structure of the nonwoven fabric layer or the like, such as a corona discharge treatment method, a mechanical surface roughening method, a solvent treatment method, an acid treatment method, and an ultraviolet light oxidation method, but not limited to these. The degree of the treatment can be measured by determining a wetting tension with a wettability reagent. The value of the wetting tension is preferably 36 mN/m or more, more preferably 40 mN/m or more.

The content of the inorganic particles in the separator is preferably 10% by mass or more and less than 100% by mass, more preferably 15% by mass or more and 99% by mass or less, still more preferably 20% by mass or more and 90% by mass or less from the viewpoint of suppression of short circuit and maintenance of rate characteristics.

<Electrolytic Solution>

The electrolytic solution used in the present embodiment preferably contains a non-aqueous solvent and a lithium salt, and further contains at least one compound selected from the group consisting of carbonate esters having carbon-carbon double bond (hereinafter also referred to as "C=C bonding"), cyclic carbonates having a fluorine atom (hereinafter also referred to as a "fluorine-containing cyclic carbonate"), and sulfones.

A variety of non-aqueous solvents can be used. Examples thereof include aprotic solvents. When an aprotic solvent is used as an electrolytic solution for a lithium ion secondary battery, aprotic polar solvents are preferable to enhance the degree of ionization of the lithium salt as an electrolyte that contributes to the charge and discharge. Specific examples thereof include cyclic carbonates such as ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, trifluoromethylethylene carbonate, fluoroethylene carbonate, and 4,5-difluoroethylene carbonate; lactones such as γ-butyrolactone and γ-valerolactone; cyclic ethers such as tetrahydrofuran and dioxane; linear carbonates such as methylethyl carbonate, dimethyl carbonate, diethyl carbonate, methylpropyl carbonate, methyl isopropyl carbonate, dipropyl carbonate, methylbutyl carbonate, dibutyl carbonate, ethylpropyl carbonate, and methyltrifluoroethyl carbonate; nitriles such as acetonitrile; linear ethers such as dimethyl ether; linear carboxylic acid esters such as methyl propionate; and linear ether carbonate compounds such as dimethoxyethane. These are used alone or in combination.

To enhance the degree of ionization of the lithium salt, the non-aqueous solvent preferably contains one or more cyclic aprotic polar solvents. From the same viewpoint, the non-aqueous solvent more preferably contains one or more cyclic carbonates such as ethylene carbonate and propylene carbonate.

To suppress decomposition of the material for the nonwoven fabric, particularly suppress decomposition of the polyester-based resins such as PET, the lithium ion secondary battery according to the present embodiment preferably contains the electrolytic solution comprising at least one compound selected from the group consisting of carbonate esters having C=C bonding, fluorine-containing cyclic carbonates, and sulfones. The electrolytic solution comprising such (a) compound(s) can form a protective coating film on the negative electrode to suppress the decomposition of the material for the nonwoven fabric. These compounds will now be simply referred to as "additives."

Examples of the carbonate esters having C=C bonding include cyclic carbonate esters and linear carbonate esters. Examples of cyclic carbonates ester having C=C bonding include unsaturated cyclic carbonate esters such as vinylene carbonate (VC), and cyclic carbonate esters having an alkenyl group having 2 to 4 carbon atoms as a substituent, such as vinyl ethylene carbonate and divinyl ethylene carbonate. Among these, vinylene carbonate is desirable from the viewpoint of the performance of the battery.

Examples of the linear carbonate esters having C=C bonding can include vinyl acetate, vinyl butyrate and vinyl hexanoate. Among these, vinyl acetate is desirable from the viewpoint of the performance of the battery.

The fluorine-containing cyclic carbonate can be any cyclic carbonate having a fluorine atom in the molecule. Examples thereof include fluorine-containing cyclic carbonates having 1 to 6 fluorine atoms such as monofluoroethylene carbonate (FEC), 1,2-difluoroethylene carbonate, 1,2,3-trifluoropropylene carbonate, 2,3-difluoro-2,3-butylene carbonate, and 1,1,1,4,4,4-hexafluoro-2,3-butylene carbonate. Among these, fluorine-containing cyclic carbonate is preferably monofluoroethylene carbonate (FEC) from the viewpoint of viscosity and the solubility of the lithium salt.

Sulfone is a compound having a sulfonyl group (—$SO_2$—) bonded to two carbon atoms in the molecule. Specific examples thereof include compounds having a sulfonyl group bonded to two alkyl groups such as sulfolane, 2-methylsulfolane, 3-methylsulfolane, dimethylsulfone, diethylsulfone, dipropylsulfone, methylethylsulfone, and methylpropylsulfone. Among these, sulfolane is preferable from the viewpoint of the performance of the battery.

The electrolytic solution preferably contains 1 to 30% by mass of the carbonate ester having C=C bonding, fluorine-containing cyclic carbonate, and sulfone in total of the amount of the electrolytic solution. At a content of these compounds of 1% by mass or more, a protective coating film can be more sufficiently formed on the negative electrode. At a content of 30% by mass or less, an increase in the resistance of the coating by the protective coating film can be suppressed to further prevent a reduction in charge and discharge properties. From such a viewpoint, the content of the compounds is more preferably 1 to 25% by mass.

An ion liquid can be used as the non-aqueous solvent. The ion liquid is a liquid composed of ions in combination of an organic cation with an anion.

Examples of the organic cation include imidazolium ion such as dialkylimidazolium cations and trialkylimidazolium cations; tetraalkylammonium ions, alkylpyridinium ions, dialkylpyrrolidinium ions, and dialkylpiperidinium ions.

Examples of usable anions as counter ions to these organic cations include $PF_6$ anions, $PF_3(C_2F_5)_3$ anions, $PF_3(CF_3)_3$ anions, $BF_4$ anions, $BF_2(CF_3)_2$ anions, $BF_3(CF_3)$ anions, bisoxalato boric acid anion, Tf (trifluoromethanesulfonyl) anions, Nf (nonafluorobutanesulfonyl) anions, bis(fluorosulfonyl)imide anion, bis(trifluoromethanesulfonyl)imide anions, bis(pentafluoroethanesulfonyl)imide anions, and dicyanoamine anions.

Specific examples of the lithium salt used in the electrolyte include $LiPF_6$, $LiBF_4$, $LiClO_4$, $LiAsF_6$, $Li_2SiF_6$, $LiOSO_2C_kF_{2k+1}$ [where k is an integer of 1 to 8], $LiN(SO_2C_kF_{2k+1})_2$ [where k is an integer of 1 to 8], $LiPF_n(C_kF_{2k+1})_{6-n}$ [where n is an integer of 1 to 5; k is an integer of 1 to 8], $LiBF_n((C_kF_{2k+1})_{4-n}$ [where n is an integer of 1 to 3; k is an integer of 1 to 8], lithium bisoxalyl borate represented by $LiB(C_2O_2)_2$, lithium difluorooxalyl borate represented by LiBF$_2$(C$_2$O$_2$), and lithium trifluorooxalyl-phosphate represented by LiPF$_3$(C$_2$O$_2$).

The lithium salt represented by Formula (a), (b), or (c) can also be used as the electrolyte:

$$LiC(SO_2R^{11})(SO_2R^{12})(SO_2R^{13}) \quad (a)$$

$$LiN(SO_2OR^{14})(SO_2OR^{15}) \quad (b)$$

$$LiN(SO_2R^{16})(SO_2R^{17}) \quad (c)$$

where $R^{11}$, $R^{12}$, $R^{13}$, $R^{14}$, $R^{15}$, $R^{16}$, and $R^{17}$ may be the same or different, and represent a perfluoroalkyl group having 1 to 8 carbon atoms.

These electrolytes are used alone or in combination. Among these electrolytes, LiPF$_6$, LiBF$_4$, and LiN(SO$_2$C$_k$F$_{2k+1}$)$_2$ [where k is an integer of 1 to 8] are preferable from the viewpoint of the properties and the stability of battery.

The electrolyte can be contained in any concentration. The concentration of the electrolyte contained in the electrolytic solution is preferably 0.1 to 3 mol/L, more preferably 0.5 to 2 mol/L.

The electrolytic solution used in an embodiment using the nonwoven fabric having a sheath-core structure particularly has high safety and the properties of the battery to satisfy the safety and the properties of the battery required for the lithium ion secondary battery, and is suitably used in the lithium ion secondary battery.

<Positive Electrode>

In the lithium ion secondary battery according to an embodiment using the nonwoven fabric having a sheath-core structure, the positive electrode uses one or more positive electrode active materials selected from the group consisting of materials that can dope and dedope lithium ions. Examples of such materials include complex oxides represented by Formulae (d) and (e), metal chalcogen compounds and metal oxides having a tunnel structure and a layer structure, and olivine phosphoric acid compounds:

$$Li_xMO_2 \quad (d)$$

$$Li_yM_2O_4 \quad (e)$$

where M represents one or more metals selected from transition metals, x represents a number of 0 to 1, and y represents a number of 0 to 2.

More specifically, examples thereof include, lithium cobalt oxides such as LiCoO$_2$; lithium manganese oxides such as LiMnO$_2$, LiMn$_2$O$_4$, and Li$_2$Mn$_2$O$_4$; lithium nickel oxides such as LiNiO$_2$; lithium containing composite metal oxides such as Li$_z$MO$_2$ (where M represents two or more elements selected from the group consisting of Ni, Mn, Co, Al, and Mg, and z represents a number of more than 0.9 and less than 1.2); and phosphoric acid iron olivine such as LiFePO$_4$. Examples of the positive electrode active material also include oxides of metals other than lithium represented by S, MnO$_2$, FeO$_2$, FeS$_2$, V$_2$O$_5$, V$_6$O$_{13}$, TiO$_2$, TiS$_2$, MoS$_2$, and NbSe$_2$. Furthermore, examples of the positive electrode active material include conductive polymers such as polyaniline, polythiophene, polyacetylene, and polypyrrole.

Preferably, the positive electrode in the lithium ion secondary battery according to the present embodiment contains a lithium containing compound as the positive electrode active material.

The lithium containing compound is preferably used as the positive electrode active material because high voltage and high energy density can be attained. Any lithium containing compound containing lithium can be used, and examples thereof include complex oxides containing lithium and transition metal elements, phosphoric acid compounds containing lithium and transition metal elements, and silicic acid metals compound containing lithium and transition metal elements (such as Li$_t$M$_u$SiO$_4$, where M is the same as in Formula (d), t represents a number of 0 to 1, and u represents a number of 0 to 2). To attain higher voltage, particularly, complex oxides containing lithium and a transition metal element selected from the group consisting of cobalt (Co), nickel (Ni), manganese (Mn), iron (Fe), copper (Cu), zinc (Zn), chromium (Cr), vanadium (V), and titanium (Ti) and phosphoric acid compounds are preferable.

More specifically, as such lithium containing compounds, metal oxides containing lithium, metal chalcogen compounds containing lithium, and phosphoric acid metal compounds containing lithium are preferable. Examples thereof include compounds represented by Formulae (f) and (g):

$$Li_vM^IO_2 \quad (f)$$

$$Li_wM^{II}PO_4 \quad (g)$$

wherein $M^I$ and $M^{II}$ each represent one or more transition metal elements; usually v represents a number of 0.05 to 1.10 and w represents a number of 0.05 to 1.10 although the values of v and w vary depending on the charge and discharge state of the battery.

The compound represented by Formula (f) typically has a layer structure, and the compound represented by Formula (g) typically has an olivine structure. Examples of the lithium containing compounds also include compounds represented by Formulae (f) and (g) in which transition metal elements are partially replaced by Al, Mg, or another transition metal element or contained in crystal grain boundaries, or oxygen atoms are partially substituted by fluorine atoms or the like to stabilize the structures of these compounds. Furthermore, examples thereof include compounds having at least part of the surface of the positive electrode active material coated with another positive electrode active material.

These positive electrode active materials are used alone or in combination.

The number average particle size (primary particle size) of the positive electrode active material is preferably 0.05 to 100 μm, more preferably 1 to 10 μm. The number average particle size of the positive electrode active material can be measured by a wet particle size measurement apparatus (such as a laser diffraction/scattering particle size distribution analyzer and a dynamic light scattering particle size distribution analyzer). Alternatively, 100 particles observed with a transmission electron microscope are extracted at random, and are analyzed with image analyzing software (such as image analyzing software available from Asahi Kasei Engineering Corporation, trade name "A-zo Kun"). The arithmetic average is calculated to determine the number average particle size. In this case, if different number average particle sizes are obtained from the sample by different measurement methods, a calibration curve produced from a reference sample may be used.

A positive electrode is prepared as follows, for example. Namely, first, the positive electrode active material and optionally a positive electrode mixture of a conductive assistant and a binder are dispersed in a solvent to prepare a positive electrode mixture containing paste. Then, the positive electrode mixture containing paste is applied to a positive electrode current collector, and is dried to form a positive electrode mixture layer. The thickness of the positive electrode mixture layer is optionally adjusted by application of pressure to prepare a positive electrode.

Here, the concentration of the solid content in the positive electrode mixture containing paste is preferably 30 to 80% by mass, more preferably 40 to 70% by mass.

The positive electrode current collector is formed of a metal foil such as an aluminum foil or a stainless steel foil.

<Negative Electrode>

In the lithium ion secondary battery according to the present embodiment, the negative electrode uses one or more negative electrode active materials selected from the group consisting of materials that can dope and dedope lithium ions, and metal lithium. In the lithium ion secondary battery in an embodiment using a nonwoven fabric having a sheath-core structure, the negative electrode preferably comprises one or more negative electrode active materials selected from the group consisting of metal lithium, carbon materials, materials containing an element that can form an alloy with lithium, and lithium containing compounds. Examples of such materials include metal lithium, and carbon materials such as hard carbon, soft carbon, artificial graphite, natural graphite, graphite, pyrolysis carbon, coke, glass carbon, calcined organic high-molecular compounds, mesocarbon micro beads, carbon fibers, activated carbon, graphite, carbon colloid, and carbon black. Among these, examples of coke include pitch coke, needle coke, and petroleum coke. The calcined organic high-molecular compounds are polymer materials such as phenol resins or fran resins calcined at proper temperatures to be carbonized. In an embodiment using a nonwoven fabric having a sheath-core structure, the lithium ion secondary battery includes batteries using metal lithium as the negative electrode active material.

Furthermore, examples of the materials that can dope and dedope lithium ions also include materials that can form an alloy with lithium. The material may be a single substance of a metal or a metalloid, may be an alloy, or may be a compound. The material may be compounds at least partially having one or two or more phases of these.

In the specification, the term "alloy" includes those composed of two or more metal elements and those composed of one or more metal elements and one or more metalloid elements. The alloy may contain a non-metal element if the entire alloy has properties as a metal. The structure of the alloy has a solid solution, an eutectic (eutectic mixture), an intermetallic compound, or two or more thereof.

Examples of such metal elements and metalloid elements include titanium (Ti), tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among these, metal elements and metalloid elements in Group 4 or 14 of the long form periodic table are preferable, and titanium, silicon, and tin are particularly preferable.

Examples of tin alloys include those containing tin and one or more second elements other than tin selected from the group consisting of silicon, magnesium (Mg), nickel, copper, iron, cobalt, manganese, zinc, indium, silver, titanium (Ti), germanium, bismuth, antimony, and chromium (Cr).

Examples of silicon alloys include those containing silicon and one or more second elements other than silicon selected from the group consisting of tin, magnesium, nickel, copper, iron, cobalt, manganese, zinc, indium, silver, titanium, germanium, bismuth, antimony, and chromium.

Examples of titanium compounds, tin compounds, and silicon compounds include those compounds containing oxygen (O) or carbon (C). These compounds may contain the second elements in addition to titanium, tin, or silicon.

Examples of the materials that can dope and dedope lithium ions include lithium containing compounds. The same lithium containing compounds as those exemplified as the positive electrode material can be used.

These negative electrode active materials are used alone or in combination.

The number average particle size (primary particle size) of the negative electrode active material is preferably 0.1 to 100 µm, more preferably 1 to 10 µm. The number average particle size of the negative electrode active material is determined in the same manner as in the number average particle size of the positive electrode active material.

A negative electrode is prepared as follows, for example. Namely, first, the negative electrode active material and optionally a negative electrode mixture of a conductive assistant and a binder are dispersed in a solvent to prepare a negative electrode mixture containing paste. Then, the negative electrode mixture containing paste is applied to a negative electrode current collector, and is dried to form a negative electrode mixture layer. The thickness of the negative electrode mixture layer is optionally adjusted by application of pressure to prepare a negative electrode.

Here, the concentration of the solid content in the negative electrode mixture containing paste is preferably 30 to 80% by mass, more preferably 40 to 70% by mass.

The negative electrode current collector is formed of a metal foil such as copper foil, a nickel foil, or a stainless steel foil.

Examples of a conductive assistant optionally used in preparation of the positive electrode and negative electrode include graphite, carbon black such as acetylene black and ketjen black, and carbon fibers. The number average particle size (primary particle size) of the conductive assistant is preferably 0.1 to 100 µm, more preferably 1 to 10 µm, and is determined in the same manner as in the number average particle size of the positive electrode active material. Examples of the binder include polyvinylidene fluoride (PVDF), copolymers containing polyvinylidene fluoride, polytetrafluoroethylene (PTFE), polyacrylic acid, styrene butadiene rubber, and fluorocarbon rubber.

The lithium ion secondary battery according to the present embodiment includes a separator, a positive electrode and a negative electrode between which the separator is interposed, a positive electrode current collector (disposed on the outer side of the positive electrode) and a negative electrode current collector (disposed on the outer side of the negative electrode) between which the laminate of the separator, the positive electrode, and the negative electrode is interposed, and a battery outer case these. The laminate of the separator, the positive electrode, and the negative electrode is impregnated with the electrolytic solution. When the combination of the electrolytic solution and the separator described above is used, other members can be members included in known lithium ion secondary batteries, and may be the members described above.

<Method of Preparing Battery>

The lithium ion secondary battery according to the present embodiment has the configuration above, and other configurations may be the same as those in known lithium ion secondary batteries. The lithium ion secondary battery according to the present embodiment is prepared by a known method with the separator, the electrolytic solution, the positive electrode, and the negative electrode described above. For example, the positive electrode, the separator, and the negative electrode are laminated in this order to form a laminate, and the laminate is rolled to form a further laminate in a roll shape. Alternatively, the laminate is folded or layered several times to form a further laminate such that a plurality of the positive electrode and the negative electrode are alternately repeated with having the separators interposed therebetween. Then, the resulting laminate is accommodated in a battery case (outer case). The electrolytic solution is poured into the case to impregnate the laminate with the electrolytic solution. The lithium ion secondary battery according to the present embodiment can be thus prepared. The lithium ion secondary battery according to the present embodiment can have any shape, and suitably has a cylindrical shape, an oval shape, a prismatic shape, a button shape, a coin shape, a flat shape, and a laminate shape.

The electrolytic solution used in the present embodiment can attain high conductivity. Accordingly, a lithium ion secondary battery including the electrolytic solution and the separator has high properties of the battery (such as charge and discharge properties, operability at low temperatures, and durability at high temperatures).

In the lithium ion secondary battery according to the present embodiment, the discharge capacity retention is preferably 80% or more, more preferably 85% or more, still more preferably 90% or more when 100 cycles of a charge and discharge cycle test at 25° C. are performed. In an embodiment using a nonwoven fabric having a sheath-core structure, the charge and discharge cycle test indicates that charge and discharge of the prepared battery is performed under a 1 C condition. One cycle constitutes one charge and one discharge of the battery. The discharge capacity retention is calculated where the discharge capacity at the second cycle is 100%.

The present embodiment can provide a lithium ion secondary battery that has a stable charge and discharge behavior while sufficiently maintaining the shape of the separator, prevents short circuit, and has high output properties.

As above, the embodiments for implementing the present invention have been described, but the present invention will not be limited to First and Second Embodiments above. The present invention can be modified in various ways in the range not to depart from the gist. For example, in Second Embodiment, the separator and the lithium ion secondary battery including the separator have been described. The separator may be a separator included in an electrochemical element other than the lithium ion secondary battery. The separator can be used in any electrochemical element, and can be preferably used in applications required for safety at high temperatures such as lithium batteries using an organic electrolytic solution (primary batteries and secondary batteries) and supercapacitor. Namely, the electrochemical element according to the present embodiment may include the separator, and other configurations and structures are not limited in particular. Accordingly, the electrochemical element according to the present embodiment can include the separator, and can have a variety of configurations and structures of various known electrochemical elements (such as lithium secondary batteries, lithium primary batteries, and supercapacitors) containing an organic electrolytic solution.

EXAMPLES

Examples and Comparative Examples of First Embodiment

First Embodiment according to the present invention will now be described in more detail by way of Examples, but the present invention and First Embodiment will not be limited to these Examples. Examples and Comparative Examples according to First Embodiment will be expressed by "Example 1- . . . " and "Comparative Example 1- . . . " while Examples and Comparative Examples according to Second Embodiment will be expressed by "Example 2- . . . " and "Comparative Example 2- . . . ". A variety of properties were measured and evaluated as follows.

(Evaluation on Adequacy of Separator for Battery)

a. Preparation of Positive Electrode

A nickel, manganese, and cobalt mixed oxide of lithium having a number average particle size of 11 μm as a positive electrode active material, graphite carbon powder having a number average particle size of 6.5 μm and acetylene black powder having a number average particle size of 48 nm as conductive assistants, and polyvinylidene fluoride (PVDF) as a binder were mixed at mixed oxide:graphite carbon powder:acetylene black powder:PVDF=100:4.2:1.8:4.6 (mass ratio). N-methyl-2-pyrrolidone was added to the mixture such that the solid content was 68% by mass, and was mixed to prepare a slurry solution. The slurry solution was applied onto one surface of an aluminum foil having a thickness of 20 μm. The solvent was removed by drying. The product was rolled with a roll press. The product after rolling was punched into a disk having a diameter of 16 mm to prepare a positive electrode (α).

b. Preparation of Negative Electrode

Graphite carbon powder (III) having a number average particle size of 12.7 μm and graphite carbon powder (IV) having a number average particle size of 6.5 μm as negative electrode active materials, a carboxymethyl cellulose solution (concentration of solid content: 1.83% by mass) as a binder, and diene-based rubber (glass transition temperature: −5° C., number average particle size during drying: 120 nm, dispersive medium: water, concentration of solid content: 40% by mass) were mixed at graphite carbon powder (III):graphite carbon powder (IV):carboxymethyl cellulose solution:diene-based rubber=90:10:1.44:1.76 (mass ratio in terms of solid content) such that the concentration of the total solid content was 45% by mass. A slurry solution was prepared. The slurry solution was applied onto one surface of a copper foil having a thickness of 10 μm. The solvent was removed by drying. The product was rolled with a roll press. The product after rolling was punched into a disk having a diameter of 16 mm to prepare a negative electrode (β).

c. Non-Aqueous Electrolyte

A solute $LiPF_6$ was dissolved in a mixed solvent of ethylene carbonate:ethyl methyl carbonate=1:2 (volume ratio) such that the concentration was 1.0 mol/L. A non-aqueous electrolyte was prepared.

d. Assembly of Lithium Ion Secondary Battery

A negative electrode, a separator, and a positive electrode were layered in this order such that the surface of the positive electrode having an active material faced that of the negative electrode having an active material. The resulting laminate was accommodated in an insulating container made of stainless steel with an insulating lid such that the copper foil of the negative electrode was in contact with the main body of the container and the aluminum foil of the positive electrode was in contact with the lid. The non-aqueous electrolyte was poured into the container, and was sealed to prepare a compact battery having 1 C=3 mA.

e. Evaluations (Evaluation on Rate Characteristics)

(Measurement 1) A prepared battery was charged at 25° C. and a constant current of 1 mA. After the voltage reached 4.2 V, the battery was charged at a constant voltage of 4.2 V for 8 hours in total. Subsequently, after a pause for 10 minutes, the battery was discharged at 1 mA to 3.0 V.

(Measurement 2) Then, the battery was charged at 25° C. and a constant current of 3 mA. After the voltage reached 4.2 V, the battery was charged at a constant voltage of 4.2 V for 3 hours in total. Subsequently, after a pause for 10 minutes, the battery was discharged at 3 mA to 3.0 V. The discharge capacity at this time was defined as the 1 C discharge capacity.

(Measurement 3) Subsequently, the battery was charged at 25° C. and a constant current of 3 mA. After the voltage reached 4.2 V, the battery was charged at a constant voltage of 4.2 V for 3 hours in total. Subsequently, after a pause for 10 minutes, the battery was discharged at 30 mA to 3.0 V. The discharge capacity at this time was defined as the 10 C discharge capacity. The proportion of the 10 C discharge capacity to the 1 C discharge capacity was calculated, and the value was defined as the rate characteristics.

rate characteristics(%)=(10 C discharge capacity/1 C discharge capacity)×100

(Check on Generation of Short Circuit)

During the charging in Measurements 1 to 3 for evaluation of the rate characteristics, the charge and discharge efficiency was calculated from the following expression. If the charge and discharge efficiency was 80% or more, it was determined that no short circuit occurred. If the charge and discharge efficiency was less than 80%, it was determined that short circuit occurred.

charge and discharge efficiency(%)=(capacity during discharge/capacity during charge)×100

Example 1-1

95.0 parts by mass of Calcined kaolin 1 (average particle size: 0.8 μm), 1 part by mass of carboxymethyl cellulose, 10.0 parts by mass of acrylic latex (AcILTX, concentration of solid content: 40%, average particle size: 147 nm, the lowest film forming temperature: 0° C. or less), 1 part by mass of an aqueous solution of ammonium polycarboxylate (available from San Nopco Limited, trade name "SN Dispersant 5468"), 1 part by mass of a polyoxyalkylene-based surfactant (available from San Nopco Limited, trade name "SN-Wet 980"), and 150 parts by mass of water were placed in a container of a non-bubbling kneader NBK-1 (available from Nippon Seiki Seisakusho K.K., trade name), and were dispersed at the number of rotations of 1500 rpm for a dispersing time of 5 minutes to prepare a uniform slurry. The inorganic particles in the resulting slurry had an average particle size of 1.91 μm, and contained 24% by volume of particles having a particle size of 1.0 μm or less and 51% by volume of particles having a particle size of 2.0 μm or more. d30 was 1.28 μm, and d10 was 0.66 μm.

Nonwoven fabric A formed of polyethylene terephthalate (PET) was prepared. Nonwoven fabric A had a porosity of 64% and a mean flow pore size of 9.1 μm, and had a laminated structure of nonwoven fabric layer formed by spunbonding (hereinafter also referred to as a "spunbonded nonwoven fabric layer", fiber diameter: 12 μm)/nonwoven fabric layer formed by the melt blown method (hereinafter also referred to as a "melt blown nonwoven fabric layer", fiber diameter: 1.7 μm)/spunbonded nonwoven fabric layer (fiber diameter: 12 μm). Nonwoven fabric A was passed through the slurry to apply the slurry to Nonwoven fabric A by pull-up coating. Subsequently, Nonwoven fabric A was passed through a gap having a predetermined interval. The solvent was removed by drying with an oven at 80° C. to prepare a separator. The separator had a porosity of 51%. The inorganic particles had a plate-like shape as shown in FIG. 4. No powder was peeled from the surface of the separator. The pore size distribution of the separator is shown in FIG. 6. The separator had one local maximum value in the range of a pore size of 0.1 to 1 μm and one local maximum value in the range of a pore size of 1 to 10 μm.

A lithium ion secondary battery was prepared using the separator.

Example 1-2

A slurry, a separator, and a lithium ion secondary battery were prepared in the same manner as in Example 1-1 except that Calcined kaolin 1 was replaced with Calcined kaolin 2 (average particle size: 1.2 μm). The inorganic particles in the resulting slurry had an average particle size of 3.04 μm, and contained 16% by volume of particles having a particle size of 1.0 μm or less and 65% by volume of particles having a particle size of 2.0 μm or more. d30 was 1.60 μm, and d10 was 0.78 μm. The separator had a porosity of 54%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-3

A slurry, a separator, and a lithium ion secondary battery were prepared in the same manner as in Example 1-1 except that calcined kaolin 1 was replaced with calcined kaolin 3 (average particle size: 2.0 μm). The inorganic particles in the resulting slurry had an average particle size of 3.84 μm, and contained 16% by volume of particles having a particle size of 1.0 μm or less and 73% by volume of particles having a particle size of 2.0 μm or more. d30 was 2.10 μm, and d10 was 0.59 μm. The separator had a porosity of 53%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-4

A slurry, a separator, and a lithium ion secondary battery were prepared in the same manner as in Example 1-1 except that calcined kaolin 1 was replaced with boehmite (average particle size: 0.8 μm). The inorganic particles in the resulting slurry had an average particle size of 1.92 μm, and contained 26% by volume of particles having a particle size of 1.0 μm or less and 50% by volume of particles having a particle size of 2.0 μm or more. d30 was 1.16 μm, and d10 was 0.52 μm. The separator had a porosity of 56%. The inorganic particles had a plate-like shape. No powder was peeled off from the surface of the separator. The pore size distribution of the separator is shown in FIG. 6. The separator had one local maximum value in the range of a pore size of 0.1 to 1 μm and one local maximum value in the range of a pore size of 1 to 10 μm.

Example 1-5

A slurry, a separator, and a lithium ion secondary battery were prepared in the same manner as in Example 1-1 except that calcined kaolin 1 was replaced with magnesium oxide (average particle size: 0.8 μm). The inorganic particles in the resulting slurry had an average particle size of 1.66 μm, and contained 38% by volume of particles having a particle size of 1.0 μm or less and 45% by volume of particles having a particle size of 2.0 μm or more. d30 was 0.55 μm, and d10 was 0.13 μm. The separator had a porosity of 55%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-6

A slurry, a separator, and a lithium ion secondary battery were prepared in the same manner as in Example 1-1 except that the dispersing time was changed from 5 minutes to 10 minutes. The inorganic particles in the resulting slurry had an average particle size of 1.61 μm, and contained 32% by volume of particles having a particle size of 1.0 μm or less and 44% by volume of particles having a particle size of 2.0 μm or more. d30 was 0.98 μm, and d10 was 0.58 μm. The separator had a porosity of 49%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-7

A slurry, a separator, and a lithium ion secondary battery were prepared in the same manner as in Example 1-1 except that the number of rotation during dispersion was changed from 1500 rpm to 2000 rpm, and the dispersing time was changed from 5 minutes to 10 minutes. The inorganic particles in the resulting slurry had an average particle size of 1.20 μm, and contained 40% by volume of particles having a particle size of 1.0 μm or less and 33% by volume of particles having a particle size of 2.0 μm or more. d30 was 0.80 μm, and d10 was 0.52 μm. The separator had a porosity of 51%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-8

A slurry, a separator, and a lithium ion secondary battery were prepared in the same manner as in Example 1-1 except that PET Nonwoven fabric A was replaced with PET Nonwoven fabric B having a porosity of 58% and a mean flow pore size of 9.0 μm and having a laminated structure of spunbonded fiber layer (fiber diameter: 12 μm)/melt blown fiber layer (fiber diameter: 1.7 μm)/spunbonded fiber layer (fiber diameter: 12 μm). The separator had a porosity of 49%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-9

A slurry, a separator, and a lithium ion secondary battery were prepared in the same manner as in Example 1-1 except that Nonwoven fabric A was replaced with Nonwoven fabric C formed of polypropylene (PP), having a porosity of 58% and a mean flow pore size of 12.0 μm, and having a laminated structure of spunbonded nonwoven fabric layer (fiber diameter: 12 μm)/melt blown nonwoven fabric layer (fiber diameter: 1.7 μm)/spunbonded nonwoven fabric layer (fiber diameter: 12 μm). The separator had a porosity of 54%. No powder was peeled off from the surface of the separator. Although the pore size distribution of the separator is not shown, the separator had one local maximum value in the range of a pore size of 0.1 to 1 μm and one local maximum value in the range of a pore size of 1 to 10 μm.

Example 1-10

A slurry, a separator, and a lithium ion secondary battery were prepared by the same method as in Example 1-3 except that the porosity of the nonwoven fabric was 57%. The separator had a porosity of 50%. No powder was peeled off from the surface of the separator.

Example 1-11

A slurry, a separator, and a lithium ion secondary battery were prepared by the same method as Example 1-2 except that the fiber diameter of the spunbonded nonwoven fabric layer was 9 μm. The separator had a porosity of 54%. No powder was peeled off from the surface of the separator.

Example 1-12

A slurry, a separator, and a lithium ion secondary battery were prepared by the same method as Example 1-2 except that the fiber diameter of the spunbonded nonwoven fabric layer was 17 μm. The separator had a porosity of 54%. No powder was peeled off from the surface of the separator.

Example 1-13

A slurry, a separator, and a lithium ion secondary battery were prepared by the same method as Example 1-2 except that the fiber diameter of the melt blown nonwoven fabric layer was 0.75 μm. The separator had a porosity of 54%. No powder was peeled off from the surface of the separator.

Example 1-14

A slurry, a separator, and a lithium ion secondary battery were prepared by the same method as Example 1-2 except that the fiber diameter of the melt blown nonwoven fabric layer was 3 μm. The separator had a porosity of 52%. No powder was peeled off from the surface of the separator.

Example 1-15

A slurry, a separator, and a lithium ion secondary battery were prepared by the same method as in Example 1-2 except that the structure of the laminated nonwoven fabric layer was changed to a two-layer laminated structure of spunbonded nonwoven fabric layer (fiber diameter: 12 μm)/melt blown nonwoven fabric layer (fiber diameter: 1.7 μm). The separator had a porosity of 54%. No powder was peeled off from the surface of the separator.

Examples 1-16 to 1-30

Slurries, separators, and lithium ion secondary battery were prepared by the same methods as Examples 1-1 to 1-15 except that a dispersion plate was used in spinning of the spunbonded nonwoven fabric. The porosity of the separator was 51% in Example 1-16, 56% in Example 1-17, 55% in Example 1-18, 53% in Example 1-19, 58% in Example 1-20, 52% in Example 1-21, 53% in Example 1-22, 52% in Example 1-23, 57% in Example 1-24, 50% in Example 1-25, 56% in Example 1-26, 58% in Example 1-27, 54% in Example 1-28, 52% in Example 1-29, and 58% in Example 1-30. No powder was peeled off from the surfaces of the separators.

Comparative Example 1-1

A lithium ion secondary battery was prepared in the same manner as in Example 1-1 except that Nonwoven fabric A was used as it was as a separator without any coating. The separator had a porosity of 64%. The pore size distribution was measured. No local maximum value was found in the range of a pore size of 0.1 to 1 μm and in the range of a pore size of 1 to 10 μm.

Comparative Example 1-2

A slurry, a separator, and a lithium ion secondary battery were prepared in the same manner as in Example 1-1 except that Calcined kaolin 1 was replaced with kaolin pharmaceutical grade (average particle size: 5.0 μm). The inorganic particles in the resulting slurry had an average particle size of 4.61 μm, and contained 0% by volume of particles having a particle size of 1.0 μm or less and 78% by volume of particles having a particle size of 2.0 μm or more. d30 was 2.55 μm, and d10 was 1.06 μm. The separator had a porosity of 54%. The pore size distribution was measured. No local maximum value was found in the range of a pore size of 0.1 to 1 μm.

Comparative Example 1-3

A slurry, a separator, and a lithium ion secondary battery were prepared in the same manner as in Example 1-1 except that the non-bubbling kneader was replaced with a DYNO-MILL MULTI LAB (available from Willy A. Bachofen AG, trade name) in the dispersion. The inorganic particles in the resulting slurry had an average particle size of 0.74 μm, and contained 77% by volume of particles having a particle size of 1.0 μm or less and 4% by volume of particles having a particle size of 2.0 μm or more. d30 was 0.51 μm, and d10 was 0.35 μm. The separator had a porosity of 51%. The pore size distribution was measured. No local maximum value was found in the range of a pore size of 1 to 10 μm.

Comparative Example 1-4

A slurry, a separator, and a lithium ion secondary battery were prepared in the same manner as in Example 1-1 except that Nonwoven fabric A was replaced with nonwoven fabric D formed of PET, having a porosity of 53% and a mean flow pore size of 8.9 μm, and having a laminated structure of spunbonded nonwoven fabric layer (fiber diameter: 12 μm)/melt blown nonwoven fabric layer (fiber diameter: 1.7 μm)/spunbonded nonwoven fabric layer (fiber diameter: 12 μm). The separator had a porosity of 43%.

Comparative Example 1-5

A slurry, a separator, and a lithium ion secondary battery were prepared in the same manner as in Example 1-1 except that nonwoven fabric A was replaced with nonwoven fabric E formed of PET, having a porosity of 62% and a mean flow pore size of 30.2 μm, and having a laminated structure of spunbonded nonwoven fabric layer (fiber diameter: 12 μm)/spunbonded nonwoven fabric layer (fiber diameter: 12 μm). The separator had a porosity of 46%. The pore size distribution was measured. No local maximum value was found in the range of a pore size of 0.1 to 1 μm and in the range of 1 to 10 μm.

Examples and Comparative Examples According to Second Embodiment

Second Embodiment according to the present invention will now be described in more detail by way of Examples, but the present invention and Second Embodiment will not be limited to these Examples. A variety of physical properties and properties are measured and evaluated by the following methods. Unless otherwise specified, the length direction of a nonwoven fabric indicates a machine direction (MD direction), and the transverse direction indicates a direction perpendicularly intersecting the length direction.

(1) Basis Weight (g/m$^2$)

According to the method specified in JIS L-1913, test samples measuring 20 cm in length (length direction)×25 cm in width (transverse direction) were prepared in 1 m×1 m regions of the nonwoven fabric, the nonwoven fabric membrane (laminate), and the separator. In each of the 1 m×1 m regions of the nonwoven fabric, the nonwoven fabric membrane (laminate), and the separator, 9 test samples in total were prepared (3 test samples per meter in the transverse direction by 3 test samples per meter in the length direction). The masses of the test samples were measured, and the average value was converted into a mass per unit area to determine the basis weight.

(2) Thickness (mm)

Before and after application of the inorganic particles and the resin binder, the thickness of the nonwoven fabric membrane and the thickness of the separator were measured with a film thickness meter. The film thickness meter used was Digimatic Indicator (trade name) available from Mitutoyo Corporation. The thickness was measured at any three places in the nonwoven fabric membrane, and the average value was defined as the thickness of the nonwoven fabric membrane.

(3) Fiber Diameter (μm)

Test samples of a 1 cm square were cut from regions segmented every 20 cm in the width direction of a sample (nonwoven fabric) excluding portions ranging from both ends to 10 cm. In the respective test samples, the diameters of fibers were measured at 30 places with a microscope. The average value of the measured values was calculated (rounded to one decimal place in μm (unit)), and was defined as the fiber diameter of the fibers contained in the sample.

(4) Particle Size Distribution and Average Particle Size of Inorganic Particles (μm)

The particle size distribution and the average particle size of inorganic particles (μm) were determined as follows. Distilled water was added to a slurry containing inorganic particles, and was stirred. After the concentration of the inorganic particles was adjusted to 0.01% by mass, the particle size distribution of the slurry in terms of volume was measured with a laser particle size distribution analyzer (available from SHIMADZU Corporation, SALD-2100), and the average particle size was determined from the particle size distribution. The particle size at a cumulative frequency of 50% was defined as the average particle size.

(5) Measurement of Charge and Discharge Capacity of Lithium Ion Secondary Battery The charge capacity and discharge capacity at a specific charge current and discharge current were measured to evaluate the charge and discharge properties of the lithium ion secondary battery.

As a lithium ion secondary battery to be measured, a compact battery at 1 C=3 mA was prepared, and was used. The charge and discharge capacity of the lithium ion secondary battery was measured with a charge and a discharge apparatus ACD-01 (trade name) available from Aska Electronic Co., Ltd. and a temperature chamber PLM-63S (trade name) available from FUTABA KAGAKU Co., Ltd.

The battery was charged at a constant current of 1 mA. After the voltage reached 4.2 V, the current value was controlled so as to keep 4.2 V. The battery was charged by this method for 8 hours in total. Subsequently, after a pause for 10 minutes, the battery was discharged at 1 mA to 3.0 V.

Then, the battery was charged at a constant current of 3 mA. After the voltage reached 4.2 V, the current value was controlled so as to keep 4.2 V. The battery was charged for 3 hours in total. Subsequently, after a pause for 10 minutes, the battery was discharged at 3 mA to 3.0 V. The discharge capacity at this time was defined as the 1 C discharge capacity (mAh).

The battery ambient temperature at this time was set at 25° C.

(6) Measurement of Output Performance (Rate Characteristics)

Next, the battery was charged at a constant current of 3 mA. After the voltage reached 4.2 V, the battery was charged at a constant voltage of 4.2 V for 3 hours in total. Subsequently, after a pause for 10 minutes, the battery was discharged at 30 mA (10 C) to a battery voltage of 3.0 V. The discharge capacity at this time was defined as the 10 C discharge capacity (mAh).

The proportion of the 10 C discharge capacity to the 1 C discharge capacity was calculated, and the value was defined as rate characteristics.

rate characteristics(%)=10 C discharge capacity/1 C discharge capacity×100

The battery ambient temperature at this time was set at 25° C. From the measurement, charge and discharge efficiency was calculated from the following expression. If the charge and discharge efficiency was 80% or more, it was determined that no short circuit occurred. If the charge and discharge efficiency was less than 80%, it was determined that short circuit occurred.

charge and discharge efficiency(%)=(capacity during discharge/capacity during charge)×100

(7) Measurement of Capacity Retention of Lithium Ion Secondary Battery (Cycle Properties)

The capacity retention was measured with a charge and a discharge apparatus ACD-01 (trade name) available from Aska Electronic Co., Ltd. and a temperature chamber PLM-63S (trade name) available from FUTABA KAGAKU Co., Ltd. As a lithium ion secondary battery to be measured, a battery prepared in the same manner as in "(5) Measurement of charge and discharge capacity of lithium ion secondary battery" was used. In the charge and discharge cycle test, first, the battery was charged at a constant current of 3 mA at the 1st cycle. After the voltage reached 4.2 V, the battery was charged at a constant voltage of 4.2 V for 3 hours in total. Subsequently, after a pause for 10 minutes, the battery was discharged at a constant current of 1 mA. When the voltage reached 3.0 V, another pause for 10 minutes was provided. Then, at and after the 2nd cycle, the battery was charged at a constant current of 3 mA. After the voltage reached 4.2 V, the battery was charged at a constant voltage of 4.2 V for 3 hours in total. Subsequently, after a pause for 10 minutes, the battery was discharged at a constant current of 3 mA. After the voltage reached 3.0 V, a pause for 10 minutes was again provided. One cycle constitutes one charge and one discharge of the battery, and 100 cycles of charge and discharge were performed. The ratio of the discharge capacity at the 100th cycle was defined as the capacity retention where the discharge capacity at the 2nd cycle was 100%. The battery ambient temperature was set at 25° C.

(8) High Temperature Durability Test on Lithium Ion Secondary Battery (High Temperature Cycle Properties)

The charge and discharge cycle test was performed 100 cycles in the same manner as in "(7) Measurement of capacity retention of lithium ion secondary battery (cycle properties)" except that part of a positive electrode active material was removed to expose an Al current collector so as to be 1 C=1.8 mA and the battery ambient temperature was set at 50° C. The capacity retention at high temperatures was measured.

(9) Check on State of Separator

After the test described in "(7) Measurement of capacity retention of lithium ion secondary battery (cycle properties)" or "(8) High temperature durability test on lithium ion secondary battery (high temperature cycle properties)" was performed, the lithium ion secondary battery was disassembled, and the state of the separator was visually checked. A separator not broken was evaluated as "No abnormalities," and a separator having breakage in a portion facing the positive electrode current collector was evaluated as "Broken."

Example 2-1

Preparation of Separator

A separator was prepared by the following method.

First, a nonwoven fabric layer comprising thermoplastic synthetic long fibers were prepared by the following method. Specifically, 20 parts by mass of a general-purpose PP as a material for a sheath portion and 80 parts by mass of general-purpose PET as a material for a core portion were used. By spunbonding, filaments were extruded from a 2-component spinneret to a moving collecting net at a spinning temperature of 300° C., and were spun at a spinning rate of 4500 m/min. Then, the filaments were charged by corona charging to approximately 3 µC/g to be sufficiently opened, and were formed into a thermoplastic synthetic long fiber web on the collecting net. The fiber diameter was adjusted by varying the drawing conditions. A nonwoven fabric comprising fibers having a fiber diameter of 12 µm and prepared by PP/PET sheath-core spunbonding (hereinafter also simply referred to as a "spunbonded nonwoven fabric").

Next, a nonwoven fabric comprising microfibers was prepared by the following method. A general-purpose PP solution was used, and filaments were spun by a melt blown method at a spinning temperature of 250° C. under heated air of 1000 Nm³/hr/m. The filaments were blown onto the spunbonded nonwoven fabric. At this time, the distance from the melt blown nozzle to the spunbonded nonwoven fabric was 100 mm, a suction power on the collecting surface located immediately under the melt blown nozzle was set at 0.2 kPa, and the air rate was set at 7 m/sec. The fiber diameter was adjusted by controlling the amount of heated air. A nonwoven fabric comprising fibers having a fiber diameter of 1.7 μm and prepared by the melt blown method (hereinafter also simply referred to as a "melt blown nonwoven fabric") was formed on the spunbonded nonwoven fabric to prepare a laminate of these nonwoven fabrics.

Furthermore, another spunbonded nonwoven fabric was prepared in the same manner as above on the surface of the melt blown nonwoven fabric in the two-layer laminate of the spunbonded nonwoven fabric and the melt blown nonwoven fabric. Thereby, a laminate of three layers of nonwoven fabrics was prepared. Next, the laminate of three layers of nonwoven fabrics was calendered so as to have a thickness of approximately 20 μm.

Separately, 95 parts by mass of calcined kaolin, 1 part by mass of carboxymethyl cellulose, 10 parts by mass of acrylic latex (AcILTX, concentration of solid content: 40%), 1 part by mass of an aqueous solution of ammonium polycarboxylate (available from San Nopco Limited, trade name "SN Dispersant 5468"), 1 part by mass of a polyoxyalkylene-based surfactant (available from San Nopco Limited, trade name "SN-Wet 980"), and 150 parts by mass of water were placed in a container of a non-bubbling kneader NBK-1 (available from Nippon Seiki Seisakusho K.K., trade name), and were dispersed at the number of rotations of 1500 rpm for 5 minutes to prepare a uniform slurry. The average particle size of the inorganic particles was determined with the resulting slurry. It was 1.9 μm.

The laminate of nonwoven fabrics after the calendering was passed through the slurry to apply the slurry onto the laminate by pull-up coating. Subsequently, the laminate was passed through a gap having a predetermined interval. Subsequently, the solvent was removed in an oven at 80° C. to prepare a sheet comprising the laminate of nonwoven fabrics, the inorganic particles, and the resin binder.

The resulting sheet was punched into a disk having a diameter of 24 mm to prepare a separator. The opening diameter distribution of the separator was measured as described above. A variety of physical properties and properties of the separator are shown in Table 3.

<Preparation of Positive Electrode>

A nickel, manganese, and cobalt mixed oxide of lithium having a number average particle size of 11 μm as a positive electrode active material, graphite carbon powder having a number average particle size of 6.5 μm and acetylene black powder having a number average particle size 48 nm as conductive assistant, and polyvinylidene fluoride (PVDF) as a binder were mixed at oxide:graphite carbon powder:acetylene black powder:PVDF=100:4.2:1.8:4.6 (mass ratio). N-methyl-2-pyrrolidone was added to the mixture such that the solid content was 68% by mass, and was mixed to prepare a slurry solution. The slurry solution was applied onto one surface of an aluminum foil having a thickness of 20 μm. The solvent was removed by drying. The product was rolled with a roll press. The product after rolling was punched into a disk having a diameter of 16 mm to prepare a positive electrode.

<Preparation of Negative Electrode>

Graphite carbon powder (III) having a number average particle size of 12.7 μm and graphite carbon powder (IV) having a number average particle size of 6.5 μm as negative electrode active materials, a carboxymethyl cellulose solution (concentration of solid content: 1.83% by mass) as a binder, and diene-based rubber (glass transition temperature: −5° C., number average particle size during drying: 120 nm, dispersive medium: water, concentration of solid content: 40% by mass) were mixed at graphite carbon powder (III):graphite carbon powder (IV):carboxymethyl cellulose solution:diene-based rubber=90:10:1.44:1.76 (mass ratio in terms of solid content) such that the concentration of the total solid content was 45% by mass. A slurry solution was prepared. The slurry solution was applied onto one surface of a copper foil having a thickness of 10 μm. The solvent was removed by drying. The product was rolled with a roll press. The product after rolling was punched into a disk having a diameter of 16 mm to prepare a negative electrode.

<Preparation of Electrolytic Solution>

A solute $LiPF_6$ was dissolved in a mixed solvent of ethylene carbonate:ethyl methyl carbonate=1:2 (volume ratio) such that the concentration was 1.0 mol/L. A non-aqueous electrolyte was prepared.

<Assembly of Battery and Evaluation>

A negative electrode, a separator, and a positive electrode were layered in this order such that the surface of the positive electrode having an active material faced that of the negative electrode having an active material. The laminate was accommodated in a stainless steel container with a lid. The container and the lid were electrically insulating. The laminate was accommodated in the container such that the copper foil of the negative electrode was in contact with the container and the aluminum foil of the positive electrode was in contact with the lid. The electrolytic solution was poured into the container. The container was sealed to prepare a lithium ion secondary battery.

The lithium ion secondary battery thus assembled was subjected to the measurements and evaluations described in "(5) Measurement of charge and discharge capacity of lithium ion secondary battery," "(6) Measurement of output performance (rate characteristics)," "(7) Measurement of capacity retention of lithium ion secondary battery (cycle properties)," and "(9) Check on state of separator." The results are shown in Table 3 (the same holds below).

Example 2-2

A lithium ion secondary battery was prepared in the same manner as in Example 2-1 except that during the preparation of the separator, the calcined kaolin having an average particle size of 1.9 μm used as the inorganic particles was replaced with calcined kaolin having an average particle size of 3.0 μm.

Example 2-3

A lithium ion secondary battery was prepared in the same manner as in Example 2-1 except that during the preparation of the separator, the calcined kaolin having an average particle size of 1.9 μm used as the inorganic particles was replaced with boehmite having an average particle size of 1.9 μm, and 5% by mass of vinylene carbonate was added to the electrolytic solution based on the amount of the electrolytic solution.

Example 2-4

A lithium ion secondary battery was prepared in the same manner as in Example 2-1 except that during the preparation of the separator, the calcined kaolin having an average particle size of 1.9 μm used as the inorganic particles was replaced with boehmite having an average particle size of 2.2 μm.

Example 2-5

A lithium ion secondary battery was prepared in the same manner as in Example 2-1 except that during the preparation of the separator, the calcined kaolin having an average particle size of 1.9 μm used as the inorganic particles was replaced with magnesium oxide having an average particle size of 1.6 μm.

Example 2-6

The lithium ion secondary battery prepared in the same manner as in Example 2-1 was subjected to the measurements and evaluations described in "(5) Measurement of charge and discharge capacity of lithium ion secondary battery," "(6) Measurement of output performance," "(8) High temperature durability test on lithium ion secondary battery (high temperature cycle properties)," and "(9) Check on state of separator."

Example 2-7

The lithium ion secondary battery prepared in the same manner as in Example 2-3 was subjected to the measurements and evaluations described in "(5) Measurement of charge and discharge capacity of lithium ion secondary battery," "(6) Measurement of output performance," "(8) High temperature durability test on lithium ion secondary battery (high temperature cycle properties)," and "(10) Check on state of separator."

Example 2-8

A lithium ion secondary battery was prepared in the same manner as in Example 2-1 except that the three-layer laminate was replaced with a single layer of
the spunbonded nonwoven fabric prepared in the same manner as above.

Example 2-9

A lithium ion secondary battery was prepared in the same manner as in Example 2-1 except that the slurry was not applied to the laminate.

Example 2-10

A lithium ion secondary battery was prepared in the same manner as in Example 2-1 except that during the preparation of the separator, the calcined kaolin having an average particle size of 1.9 μm used as the inorganic particles was replaced with calcined kaolin having an average particle size of 0.8 μm.

Example 2-11

A lithium ion secondary battery was prepared in the same manner as in Example 2-1 except that during the preparation of the separator, the calcined kaolin having an average particle size of 1.9 μm used as the inorganic particles was replaced with calcined kaolin having an average particle size of 4.8 μm.

Example 2-12

A lithium ion secondary battery was prepared in the same manner as in Example 2-1 except that during the preparation of the separator, the calcined kaolin having an average particle size of 1.9 μm used as the inorganic particles was replaced with boehmite having an average particle size of 6.6 μm.

Comparative Example 2-1

A lithium ion secondary battery was prepared in the same manner as in Example 2-1 except that during the preparation of the separator, two layers of the spunbonded nonwoven fabric included in the three-layer laminate were formed by the following method to prepare a three-layer laminate. Namely, a general-purpose PET solution was used. By spunbonding, filaments were extruded at a spinning temperature of 300° C. to a moving collecting net, and were spun at a spinning rate of 4500 m/min. Then, the filaments were charged by corona charging to approximately 3 μC/g to be sufficiently opened, and were formed into a thermoplastic synthetic long fiber web on the collecting net. The fiber diameter was adjusted by varying the drawing conditions. A spunbonded nonwoven fabric comprising fibers having a fiber diameter of 12 μm was prepared. Another spunbonded nonwoven fabric was prepared in the same manner as above on the surface of the melt blown nonwoven fabric in the two-layer laminate of the spunbonded nonwoven fabric and the melt blown nonwoven fabric. Thereby, a laminate of three layers of these nonwoven fabrics was prepared. The resulting lithium ion secondary battery was evaluated in the same manner as in Example 2-7.

Comparative Example 2-2

A lithium ion secondary battery was prepared in the same manner as in Comparative Example 2-1 except that during the preparation of the separator, the calcined kaolin having an average particle size of 1.9 μm used as the inorganic particles was replaced with boehmite having an average particle size of 1.9 μm. The resulting lithium ion secondary battery was evaluated in the same manner as in Example 2-7.

The configurations of separators, the results of evaluation on the rate characteristics of the resulting lithium ion secondary batteries, and generation of short circuit in Examples 1-1 to 1-30, Examples 2-1 to 2-12, Comparative Examples 1-1 to 1-5, and Comparative Examples 2-1 and 2-2 are shown in Tables 1 to 3.

TABLE 1

| | Slurry | | | |
| --- | --- | --- | --- | --- |
| | Oxide particle | | Dispersing method Non-bubbling kneader | |
| | Name of particle (composition) | μm | The number of rotations rpm | Treatment time min |
| Example 1-1 | Calcined kaolin 1 | 0.8 | 1500 | 5 |
| Example 1-2 | Calcined kaolin 2 | 1.2 | 1500 | 5 |
| Example 1-3 | Calcined kaolin 3 | 2.0 | 1500 | 5 |
| Example 1-4 | Boehmite | 1.0 | 1500 | 5 |
| Example 1-5 | Magnesium oxide | 0.8 | 1500 | 5 |
| Example 1-6 | Calcined kaolin 1 | 0.8 | 1500 | 10 |
| Example 1-7 | Calcined kaolin 1 | 0.8 | 2000 | 15 |
| Example 1-8 | Calcined kaolin 1 | 0.8 | 1500 | 5 |
| Example 1-9 | Calcined kaolin 1 | 0.8 | 1500 | 5 |
| Example 1-10 | Calcined kaolin 3 | 2.0 | 1500 | 5 |
| Example 1-11 | Calcined kaolin 2 | 1.2 | 1500 | 5 |
| Example 1-12 | Calcined kaolin 2 | 1.2 | 1500 | 5 |
| Example 1-13 | Calcined kaolin 2 | 1.2 | 1500 | 5 |
| Example 1-14 | Calcined kaolin 2 | 1.2 | 1500 | 5 |
| Example 1-15 | Calcined kaolin 2 | 1.2 | 1500 | 5 |
| Example 1-16 | Calcined kaolin 1 | 0.8 | 1500 | 5 |
| Example 1-17 | Calcined kaolin 2 | 1.2 | 1500 | 5 |
| Example 1-18 | Calcined kaolin 3 | 2.0 | 1500 | 5 |
| Example 1-19 | Boehmite | 1.0 | 1500 | 5 |
| Example 1-20 | Magnesium oxide | 0.8 | 1500 | 5 |
| Example 1-21 | Calcined kaolin 1 | 0.8 | 1500 | 10 |

TABLE 1-continued

| | | | | |
|---|---|---|---|---|
| Example 1-22 | Calcined kaolin 1 | 0.8 | 2000 | 15 |
| Example 1-23 | Calcined kaolin 1 | 0.8 | 1500 | 5 |
| Example 1-24 | Calcined kaolin 1 | 0.8 | 1500 | 5 |
| Example 1-25 | Calcined kaolin 3 | 2.0 | 1500 | 5 |
| Example 1-26 | Calcined kaolin 2 | 1.2 | 1500 | 5 |
| Example 1-27 | Calcined kaolin 2 | 1.2 | 1500 | 5 |
| Example 1-28 | Calcined kaolin 2 | 1.2 | 1500 | 5 |
| Example 1-29 | Calcined kaolin 2 | 1.2 | 1500 | 5 |
| Example 1-30 | Calcined kaolin 2 | 1.2 | 1500 | 5 |
| Comparative Example 1-1 | Not applied | — | — | — |
| Comparative Example 1-2 | Calcined kaolin 4 | 5.0 | 1500 | 5 |
| Comparative Example 1-3 | Calcined kaolin 1 | 0.8 | — | — |
| Comparative Example 1-4 | Calcined kaolin 1 | 0.8 | 1500 | 5 |
| Comparative Example 1-5 | Calcined kaolin 1 | 0.8 | 1500 | 5 |

| | Slurry Dispersing method Bead mill | | | |
|---|---|---|---|---|
| | Material for beads | Diameter of bead mm | Circumferential speed m/sec | Treatment time min |
| Example 1-1 | — | — | — | — |
| Example 1-2 | — | — | — | — |
| Example 1-3 | — | — | — | — |
| Example 1-4 | — | — | — | — |
| Example 1-5 | — | — | — | — |
| Example 1-6 | — | — | — | — |
| Example 1-7 | — | — | — | — |
| Example 1-8 | — | — | — | — |
| Example 1-9 | — | — | — | — |
| Example 1-10 | — | — | — | — |
| Example 1-11 | — | — | — | — |
| Example 1-12 | — | — | — | — |
| Example 1-13 | — | — | — | — |
| Example 1-14 | — | — | — | — |
| Example 1-15 | — | — | — | — |
| Example 1-16 | — | — | — | — |
| Example 1-17 | — | — | — | — |
| Example 1-18 | — | — | — | — |
| Example 1-19 | — | — | — | — |
| Example 1-20 | — | — | — | — |
| Example 1-21 | — | — | — | — |
| Example 1-22 | — | — | — | — |
| Example 1-23 | — | — | — | — |
| Example 1-24 | — | — | — | — |
| Example 1-25 | — | — | — | — |
| Example 1-26 | — | — | — | — |
| Example 1-27 | — | — | — | — |
| Example 1-28 | — | — | — | — |
| Example 1-29 | — | — | — | — |
| Example 1-30 | — | — | — | — |
| Comparative Example 1-1 | — | — | — | — |
| Comparative Example 1-2 | — | — | — | — |
| Comparative Example 1-3 | ZrO2 | 0.3 | 8 | 10 |
| Comparative Example 1-4 | — | — | — | — |
| Comparative Example 1-5 | — | — | — | — |

| | Slurry | | | | |
|---|---|---|---|---|---|
| | Average particle size μm | Proportion of particles having diameter of 1 μm or less % by volume | Proportion of particles having diameter of 2 μm or more % by volume | d30 μm | d10 μm |
| Example 1-1 | 1.91 | 24% | 49% | 1.28 | 0.66 |
| Example 1-2 | 3.04 | 16% | 65% | 1.6 | 0.78 |
| Example 1-3 | 3.84 | 16% | 73% | 2.1 | 2.1 |
| Example 1-4 | 1.92 | 26% | 50% | 1.16 | 0.52 |
| Example 1-5 | 1.66 | 38% | 45% | 0.55 | 0.13 |
| Example 1-6 | 1.61 | 32% | 44% | 0.98 | 0.58 |
| Example 1-7 | 1.2 | 40% | 33% | 0.80 | 0.52 |
| Example 1-8 | 1.91 | 24% | 49% | 1.28 | 0.66 |
| Example 1-9 | 1.91 | 24% | 49% | 1.28 | 0.66 |
| Example 1-10 | 3.84 | 16% | 73% | 2.1 | 2.1 |
| Example 1-11 | 3.04 | 16% | 65% | 1.6 | 0.78 |
| Example 1-12 | 3.04 | 16% | 65% | 1.6 | 0.78 |
| Example 1-13 | 3.04 | 16% | 65% | 1.6 | 0.78 |
| Example 1-14 | 3.04 | 16% | 65% | 1.6 | 0.78 |
| Example 1-15 | 3.04 | 16% | 65% | 1.6 | 0.78 |
| Example 1-16 | 1.91 | 24% | 49% | 1.28 | 0.66 |
| Example 1-17 | 3.04 | 16% | 65% | 1.6 | 0.78 |
| Example 1-18 | 3.84 | 16% | 73% | 2.1 | 2.1 |
| Example 1-19 | 1.92 | 26% | 50% | 1.16 | 0.52 |
| Example 1-20 | 1.66 | 38% | 45% | 0.55 | 0.13 |
| Example 1-21 | 1.61 | 32% | 44% | 0.98 | 0.58 |
| Example 1-22 | 1.2 | 40% | 33% | 0.80 | 0.52 |
| Example 1-23 | 1.91 | 24% | 49% | 1.28 | 0.66 |
| Example 1-24 | 1.91 | 24% | 49% | 1.28 | 0.66 |
| Example 1-25 | 3.84 | 16% | 73% | 2.1 | 2.1 |
| Example 1-26 | 3.04 | 16% | 65% | 1.6 | 0.78 |
| Example 1-27 | 3.04 | 16% | 65% | 1.6 | 0.78 |
| Example 1-28 | 3.04 | 16% | 65% | 1.6 | 0.78 |
| Example 1-29 | 3.04 | 16% | 65% | 1.6 | 0.78 |
| Example 1-30 | 3.04 | 16% | 65% | 1.6 | 0.78 |
| Comparative Example 1-1 | — | — | — | — | — |
| Comparative Example 1-2 | 4.61 | 10% | 78% | 2.55 | 1.06 |
| Comparative Example 1-3 | 0.741 | 77% | 4% | 0.51 | 0.35 |
| Comparative Example 1-4 | 1.91 | 24% | 49% | 1.28 | 0.66 |
| Comparative Example 1-5 | 1.91 | 24% | 49% | 1.28 | 0.66 |

TABLE 2

| | Nonwoven fabric substrate | | | | |
|---|---|---|---|---|---|
| | Material | Porosity % | Mean flow pore size μm | Thickness μm | Basis weight g/m2 | Coefficient of variation of texture — |
| Example 1-1 | PET | 64% | 9.1 | 20 | 10 | 2.2 |
| Example 1-2 | | | | | | |
| Example 1-3 | | | | | | |
| Example 1-4 | | | | | | |
| Example 1-5 | | | | | | |
| Example 1-6 | | | | | | |
| Example 1-7 | | | | | | |
| Example 1-8 | | 58% | 9.0 | 19 | 11 | 2.1 |
| Example 1-9 | PP | 64% | 12 | 20 | 6.6 | 2.4 |
| Example 1-10 | PET | 57% | 11 | 17 | 10 | 2.1 |
| Example 1-11 | | 64% | 9.3 | 20 | 10 | 1.9 |
| Example 1-12 | | | 9.5 | | | 2.3 |
| Example 1-13 | | | 8.3 | | | 2.0 |
| Example 1-14 | | | 12.5 | | | 2.3 |
| Example 1-15 | PET | | 7.6 | | | 1.9 |
| Example 1-16 | PET | 64% | 9.1 | 20 | 10 | 1.5 |
| Example 1-17 | | | | | | |
| Example 1-18 | | | | | | |
| Example 1-19 | | | | | | |
| Example 1-20 | | | | | | |
| Example 1-21 | | | | | | |
| Example 1-22 | | | | | | |
| Example 1-23 | | 58% | 9.0 | 19 | 11 | 1.5 |
| Example 1-24 | PP | 64% | 12 | 20 | 6.6 | 1.7 |
| Example 1-25 | PET | 57% | 11 | 17 | 10 | 1.5 |
| Example 1-26 | | 64% | 9.3 | 20 | 10 | 1.4 |
| Example 1-27 | | | 9.5 | | | 1.7 |
| Example 1-28 | | | 8.3 | | | 1.3 |
| Example 1-29 | | | 12.5 | | | 2.3 |
| Example 1-30 | PET | | 7.6 | | | 1.3 |

TABLE 2-continued

| | | | | | | |
|---|---|---|---|---|---|---|
| Comparative Example 1-1 | PET | 64% | 9.1 | 20 | 10 | 2.2 |
| Comparative Example 1-2 | | | | | | |
| Comparative Example 1-3 | | | | | | |
| Comparative Example 1-4 | | 53% | 8.9 | 32 | 20 | 2.1 |
| Comparative Example 1-5 | | 62% | 30.2 | 19 | 10 | 2.7 |

| | Nonwoven fabric substrate | | | Separator | |
|---|---|---|---|---|---|
| | Structure S: spun-bond M: melt blown | Diameter of spun-bonded fiber μm | Diameter of melt blown fiber μm | Coating basis weight g/m2 | Total basis weight g/m2 |
| Example 1-1 | SMS | 12 | 1.7 | 9.5 | 19.5 |
| Example 1-2 | | | | 6.4 | 16.4 |
| Example 1-3 | | | | 5.9 | 15.9 |
| Example 1-4 | | | | 6.6 | 16.6 |
| Example 1-5 | | | | 6.2 | 16.2 |
| Example 1-6 | | | | 11.9 | 21.9 |
| Example 1-7 | | | | 9.5 | 19.5 |
| Example 1-8 | SMS | 12 | 1.7 | 5.9 | 16.9 |
| Example 1-9 | SMS | 12 | 1.7 | 6.2 | 12.8 |
| Example 1-10 | SMS | 12 | 1.7 | 5.9 | 15.9 |
| Example 1-11 | | 9 | 1.7 | 6.4 | 16.4 |
| Example 1-12 | | 17 | 1.7 | 6.2 | 16.2 |
| Example 1-13 | | 12 | 0.75 | 6.3 | 16.3 |
| Example 1-14 | | 12 | 3 | 6.3 | 16.3 |
| Example 1-15 | SM | 12 | 1.7 | 6.4 | 16.4 |
| Example 1-16 | SMS | 12 | 1.7 | 9.3 | 19.3 |
| Example 1-17 | | | | 6.5 | 16.5 |
| Example 1-18 | | | | 6.0 | 16.0 |
| Example 1-19 | | | | 6.7 | 16.7 |
| Example 1-20 | | | | 6.0 | 16.0 |
| Example 1-21 | | | | 12.3 | 22.3 |
| Example 1-22 | | | | 9.2 | 19.2 |
| Example 1-23 | SMS | 12 | 1.7 | 5.6 | 16.6 |
| Example 1-24 | SMS | 12 | 1.7 | 6.0 | 12.6 |
| Example 1-25 | SMS | 12 | 1.7 | 5.9 | 15.9 |
| Example 1-26 | | 9 | 1.7 | 6.4 | 16.4 |
| Example 1-27 | | 17 | 1.7 | 6.2 | 16.2 |
| Example 1-28 | | 12 | 0.75 | 6.3 | 16.3 |
| Example 1-29 | | 12 | 3 | 6.3 | 16.3 |
| Example 1-30 | SM | 12 | 1.7 | 6.4 | 16.4 |
| Comparative Example 1-1 | SMS | 12 | 1.7 | — | 10.0 |
| Comparative Example 1-2 | | | | 6.6 | 16.6 |
| Comparative Example 1-3 | | | | 8.2 | 18.2 |
| Comparative Example 1-4 | SMS | 12 | 1.7 | 9.5 | 19.5 |
| Comparative Example 1-5 | S | 12 | — | 9.5 | 19.5 |

| | Separator | | Results of evaluation on battery | |
|---|---|---|---|---|
| | Thickness μm | Porosity % | Rate characteristics of battery 10 C/1 C(%) | Short circuit during charge o: No short circuit, x: Short circuit |
| Example 1-1 | 22 | 51 | 60% | o |
| Example 1-2 | 21 | 54 | 61% | o |
| Example 1-3 | 20 | 53 | 54% | o |
| Example 1-4 | 21 | 56 | 56% | o |
| Example 1-5 | 20 | 55 | 54% | o |
| Example 1-6 | 23 | 49 | 52% | o |
| Example 1-7 | 22 | 51 | 53% | o |
| Example 1-8 | 20 | 49 | 51% | o |
| Example 1-9 | 21 | 54 | 52% | o |
| Example 1-10 | 19 | 50 | 58% | o |
| Example 1-11 | 21 | 54 | 63% | o |
| Example 1-12 | 21 | 54 | 58% | o |
| Example 1-13 | 21 | 54 | 62% | o |
| Example 1-14 | 20 | 52 | 54% | o |
| Example 1-15 | 21 | 54 | 64% | o |
| Example 1-16 | 22 | 51 | 65% | o |
| Example 1-17 | 22 | 56 | 67% | o |
| Example 1-18 | 21 | 55 | 61% | o |
| Example 1-19 | 20 | 53 | 62% | o |
| Example 1-20 | 21 | 58 | 61% | o |
| Example 1-21 | 23 | 52 | 62% | o |
| Example 1-22 | 23 | 53 | 60% | o |
| Example 1-23 | 21 | 52 | 58% | o |
| Example 1-24 | 22 | 57 | 57% | o |
| Example 1-25 | 19 | 50 | 62% | o |
| Example 1-26 | 22 | 56 | 66% | o |
| Example 1-27 | 23 | 58 | 63% | o |
| Example 1-28 | 21 | 54 | 67% | o |
| Example 1-29 | 20 | 52 | 61% | o |
| Example 1-30 | 23 | 58 | 68% | o |
| Comparative Example 1-1 | 20 | 64 | 62% | x |
| Comparative Example 1-2 | 21 | 54 | 47% | x |
| Comparative Example 1-3 | 21 | 51 | 42% | o |
| Comparative Example 1-4 | 33 | 43 | 20% | o |
| Comparative Example 1-5 | 20 | 46 | 29% | x |

TABLE 3

| | material for nonwoven fabric (% by mass) | Structure*1 | Thickness*3 (μm) | M*1 fiber diameter (μm) | S*1 fiber diameter (μm) | Laminate basis weight (g/m²) | M*1 Basis weight (g/m²) | S*1 Basis weight (g/m²) |
|---|---|---|---|---|---|---|---|---|
| Example 2-1 | PP-PET(20/80) | SMS | 20 | 1.7 | 12 | 10 | 2.5 | 7.5 |
| Example 2-2 | PP-PET(20/80) | SMS | 20 | 1.7 | 12 | 10 | 2.5 | 7.5 |
| Example 2-3 | PP-PET(20/80) | SMS | 20 | 1.7 | 12 | 10 | 2.5 | 7.5 |
| Example 2-4 | PP-PET(20/80) | SMS | 20 | 1.7 | 12 | 10 | 2.5 | 7.5 |
| Example 2-5 | PP-PET(20/80) | SMS | 20 | 1.7 | 12 | 10 | 2.5 | 7.5 |
| Example 2-6 | PP-PET(20/80) | SMS | 20 | 1.7 | 12 | 10 | 2.5 | 7.5 |
| Example 2-7 | PP-PET(20/80) | SMS | 20 | 1.7 | 12 | 10 | 2.5 | 7.5 |
| Example 2-8 | PP-PET(20/80) | S | 20 | — | 12 | 10 | 2.5 | 10 |
| Example 2-9 | PP-PET(20/80) | SMS | 20 | 1.7 | 12 | 10 | 2.5 | 7.5 |
| Example 2-10 | PP-PET(20/80) | SMS | 20 | 1.7 | 12 | 10 | 2.5 | 7.5 |
| Example 2-11 | PP-PET(20/80) | SMS | 20 | 1.7 | 12 | 10 | 2.5 | 7.5 |
| Example 2-12 | PP-PET(20/80) | SMS | 20 | 1.7 | 12 | 10 | 2.5 | 7.5 |
| Comparative Example 2-1 | PET | SMS | 20 | 1.7 | 12 | 10 | 2.5 | 7.5 |

TABLE 3-continued

| | | | | | | | |
|---|---|---|---|---|---|---|---|
| Comparative Example 2-2 | PET | SMS | 20 | 1.7 | 12 | 10 | 2.5 | 7.5 |

| | Inorganic material | Average particle size (μm) | Thickness after application of inorganic particles (μm) | Total basis weight of separator (g/m2) | Additive | Amount of additive to be added (wt %) |
|---|---|---|---|---|---|---|
| Example 2-1 | Kaolin | 1.9 | 22 | 19.5 | — | — |
| Example 2-2 | Kaolin | 3.0 | 21 | 16.4 | — | — |
| Example 2-3 | Boehmite | 1.9 | 23 | 16.4 | VC | 5 |
| Example 2-4 | Boehmite | 2.2 | 23 | 20.8 | — | — |
| Example 2-5 | MgO | 1.6 | 22 | 21.9 | — | — |
| Example 2-6 | Kaolin | 1.9 | 22 | 19.5 | — | — |
| Example 2-7 | Boehmite | 1.9 | 23 | 16.4 | — | — |
| Example 2-8 | Kaolin | 1.9 | 22 | 28.2 | — | — |
| Example 2-9 | — | — | — | 10 | — | — |
| Example 2-10 | Kaolin | 0.8 | 22 | 18.2 | — | — |
| Example 2-11 | Kaolin | 4.8 | 21 | 16.6 | — | — |
| Example 2-12 | Boehmite | 6.6 | 21 | 21.4 | — | — |
| Comparative Example 2-1 | Kaolin | 1.9 | 22 | 19.5 | — | — |
| Comparative Example 2-2 | Boehmite | 1.9 | 23 | 19.5 | — | — |

| | Generation of short circuit during initial charge | 10 C capacity (%) | Temperature during cycle test (° C.) | Capacity retention (%) | State of separator |
|---|---|---|---|---|---|
| Example 2-1 | No short circuit | 60 | 25 | 95 | No abnormalities |
| Example 2-2 | No short circuit | 61 | 25 | 93 | No abnormalities |
| Example 2-3 | No short circuit | 53 | 25 | 94 | No abnormalities |
| Example 2-4 | No short circuit | 51 | 25 | 91 | No abnormalities |
| Example 2-5 | No short circuit | 53 | 25 | 94 | No abnormalities |
| Example 2-6 | No short circuit | 60 | 50 | 88 | No abnormalities |
| Example 2-7 | No short circuit | 53 | 50 | 86 | No abnormalities |
| Example 2-8 | Short circuit | 29 | 25 | 93 | No abnormalities |
| Example 2-9 | Short circuit | 62 | 25 | 92 | No abnormalities |
| Example 2-10 | No short circuit | 45 | 25 | 94 | No abnormalities |
| Example 2-11 | No short circuit | 49 | 25 | 91 | No abnormalities |
| Example 2-12 | No short circuit | 47 | 25 | 86 | No abnormalities |
| Comparative Example 2-1 | No short circuit | 60 | 50 | Measurement impossible[2] | Broken |
| Comparative Example 2-2 | No short circuit | 53 | 50 | Measurement impossible[2] | Broken |

[1]"M" represents a melt blown nonwoven fabric, and "S" represents a spunbonded nonwoven fabric.
[2]"Measurement impossible" indicates that charge and discharge cycles cannot be performed after 50 cycles.
[3]indicates the thickness of a laminate of a nonwoven fabric after calendering.

Tables 1 to 3 evidently show that the lithium ion secondary battery including the separator formed of the slurry containing the inorganic particles having a specific particle size distribution and the nonwoven fabric having a specific pore structure as the substrate are batteries that prevents short circuit and have higher safety without reducing rate characteristics.

This application is based on Japanese Patent Application Nos. 2012-206121 and 2012-206105, filed on Sep. 19, 2012, the contents of which are incorporated herein by reference.

INDUSTRIAL APPLICABILITY

The lithium ion secondary battery according to the present invention is expected to be used as a rechargeable battery for vehicles such as hybrid electric vehicles, plug-in hybrid electric vehicles, electric vehicles as well as portable devices such as mobile phones, portable audio players, and personal computers.

REFERENCE SIGNS LIST

1 . . . nonwoven fabric layer comprising microfibers, 2 . . . nonwoven fabric layer, 3 . . . laminated nonwoven fabric, 10 . . . spinneret, 20 . . . expelled filaments, 30 . . . air aspirators, 40 . . . consecutively connected channels, 50 . . . corona charging channel device, 60 . . . dispersion plate, 70 . . . charging filaments, 80 . . . collecting surface, 90 . . . web, 100 . . . apparatus for preparing spunbonded nonwoven fabric.

The invention claimed is:

1. A separator comprising a substrate having an inner surface and an outer surface, and inorganic particles present on the outer surface and the inner surface of the substrate, wherein the substrate has a porosity of 55% or more and a mean flow pore size of 30 μm or less and comprises nonwoven fabric that has a coefficient of texture variation of 1.7 or less and a total basis weight of 5 to 15 g/m$^2$, the inorganic particles have an average particle size of 1.0 to 4.0 μm, and the inorganic particles comprise 40% by volume or less of particles having a particle size of 1.0 μm or less and 30 to 75% by volume of particles having a particle size of 2.0 μm or more.

2. The separator according to claim 1, wherein the substrate comprises a nonwoven fabric containing one or more resins selected from the group consisting of polyolefin-based resins and polyester-based resins.

3. The separator according to claim 2, wherein the substrate comprises a laminated nonwoven fabric comprising a first nonwoven fabric layer comprising fibers having a fiber diameter of 4.0 µm or less and a second nonwoven fabric layer comprising fibers having a fiber diameter of more than 4.0 µm and 30.0 µm or less.

4. The separator according to claim 1, further comprising 4 parts by mass or more of a binder based on 100 parts by mass of the inorganic particles, the binder being present inside the substrate.

5. A separator comprising a substrate having an inner surface and an outer surface, and inorganic particles present on the outer surface and the inner surface of the substrate,
wherein the substrate comprises a laminated nonwoven fabric formed by laminating a plurality of nonwoven fabric layers,
the laminated nonwoven fabric has a coefficient of texture variation of 1.7 or less and a total basis weight of 5 to 15 g/m$^2$, and
the separator has a porosity of 45 to 70%,
a pore size distribution of the separator has one or more local maximum values in the range of a pore size of 0.1 to 1 µm and one or more local maximum values in the range of a pore size of 1 to 10 µm.

6. A method of preparing the separator according to claim 1, the method comprising the steps of:
dispersing inorganic particles in a dispersive medium to prepare a slurry,
applying the slurry to a substrate or impregnating a substrate with the slurry to prepare a substrate with the slurry, and
drying the substrate with the slurry,
wherein the substrate has a porosity of 55% or more and a mean flow pore size of 30 µm or less,
the inorganic particles have the average particle size of 1.0 to 4.0 µm or less, and the inorganic particles comprise 40% by volume or less of particles having a particle size of 1.0 µm or less and 30 to 75% by volume of particles having a particle size of 2.0 µm or more.

7. The separator according to claim 1, wherein the inorganic particles have a plate-like shape.

8. The separator according to claim 1, wherein the separator is used for an electrochemical element.

9. A lithium ion secondary battery, comprising a positive electrode, a negative electrode, an electrolytic solution, and the separator according to claim 1.

10. The lithium ion secondary battery according to claim 9, wherein the electrolytic solution comprises at least one compound selected from the group consisting of carbonate esters having carbon-carbon double bond, cyclic carbonates having a fluorine atom, and sulfones.

11. The lithium ion secondary battery according to claim 10, wherein the carbonate esters having carbon-carbon double bond comprise vinylene carbonate, the cyclic carbonates having a fluorine atom comprise fluoroethylene carbonate, and the sulfones comprise sulfolane.

12. The separator according to claim 1, wherein the nonwoven fabric is a laminated nonwoven fabric comprising a nonwoven fabric layer (I) and a nonwoven fabric layer (II), wherein
the nonwoven fabric layer (I) contains 50% or more of microfibers having a fiber diameter from 0.3 µm to 4 µm, and
the nonwoven fabric layer (II) contains fibers having a fiber diameter of more than 4.0 µm and 30.0 µm or less.

* * * * *